US012358627B2

(12) United States Patent
Bires et al.

(10) Patent No.: US 12,358,627 B2
(45) Date of Patent: Jul. 15, 2025

(54) ACOUSTIC AIR DUCT FOR ENVIRONMENTAL CONTROL SYSTEM IN VEHICLE

(71) Applicant: The Boeing Company, Chicago, IL (US)

(72) Inventors: Rachel Ann Bires, Lake Stevens, WA (US); Douglas Dean Maben, Snohomish, WA (US); Christopher Edward Plass, Snohomish, WA (US); Mark Michael Gmerek, Clinton, WA (US); David William Olson, Gold Bar, WA (US); Sonny Keever Nguyen, Mill Creek, WA (US); James Julius Koch, Everett, WA (US); Greta Grace Hadford, Snohomish, WA (US); Bryce Avery Van Dyke, Snohomish, WA (US); Xin Han, Bothell, WA (US)

(73) Assignee: THE BOEING COMPANY, Arlington, VA (US)

( * ) Notice: Subject to any disclaimer, the term of this patent is extended or adjusted under 35 U.S.C. 154(b) by 338 days.

(21) Appl. No.: 17/970,881

(22) Filed: Oct. 21, 2022

(65) Prior Publication Data
US 2024/0132218 A1 Apr. 25, 2024
US 2024/0228045 A9 Jul. 11, 2024

(51) Int. Cl.
*B64D 13/00* (2006.01)
*B32B 1/08* (2006.01)
(Continued)

(52) U.S. Cl.
CPC ............... *B64D 13/00* (2013.01); *B32B 1/08* (2013.01); *B32B 3/266* (2013.01); *B32B 5/024* (2013.01);
(Continued)

(58) Field of Classification Search
CPC .................. B64D 13/00; B64D 13/06; B64D 2013/0603; B64D 2013/0625;
(Continued)

(56) References Cited

U.S. PATENT DOCUMENTS 3,770,560 A * 11/1973 Elder ........................ B32B 3/30
428/116
3,948,295 A 4/1976 Lemont et al.
(Continued)

FOREIGN PATENT DOCUMENTS

WO 2021014084 A1 1/2021

OTHER PUBLICATIONS

Schram, C., et al., "Innovative noise control in ducts", American Institute of Aeronautics and Astronautics, 23rd AIAA/CEAS Aeroacoustics Conference, Jun. 5-9, 2017, pp. 1-8.

*Primary Examiner* — Forrest M Phillips
*Assistant Examiner* — Joseph James Peter Illicete
(74) *Attorney, Agent, or Firm* — COATS & BENNETT, PLLC

(57) ABSTRACT

Apparatuses, systems, and methods comprising acoustically absorptive air ducts comprising an internally positioned structure component as an endoskeleton and an air impervious inner layer, and an acoustically absorptive foam outer layer, environmental control systems comprising such air ducts, and vehicles incorporating such environmental control systems are disclosed with methods for manufacture and installations are disclosed.

20 Claims, 13 Drawing Sheets

(51) Int. Cl.
  *B32B 3/26* (2006.01)
  *B32B 5/02* (2006.01)
  *B32B 5/26* (2006.01)
  *B32B 7/12* (2006.01)
  *B32B 27/08* (2006.01)
  *B32B 27/12* (2006.01)
  *B32B 27/28* (2006.01)
  *B32B 27/42* (2006.01)
  *B32B 37/18* (2006.01)
  *G10K 11/168* (2006.01)

(52) U.S. Cl.
  CPC ............. *B32B 5/262* (2021.05); *B32B 7/12* (2013.01); *B32B 27/08* (2013.01); *B32B 27/12* (2013.01); *B32B 27/285* (2013.01); *B32B 27/42* (2013.01); *B32B 37/182* (2013.01); *G10K 11/168* (2013.01); *B32B 2260/023* (2013.01); *B32B 2260/046* (2013.01); *B32B 2262/106* (2013.01); *B32B 2307/102* (2013.01); *B32B 2307/7242* (2013.01); *B32B 2307/732* (2013.01); *B32B 2597/00* (2013.01); *B32B 2605/18* (2013.01)

(58) Field of Classification Search
  CPC ... B64D 2033/0206; B32B 1/08; B32B 3/266; B32B 5/024; B32B 5/262; B32B 7/12; B32B 27/08; B32B 27/12; B32B 27/285; B32B 27/42; B32B 37/182; B32B 2260/023; B32B 2260/046; B32B 2262/106; B32B 2307/102; B32B 2307/7242; B32B 2307/732; B32B 2597/00; B32B 2605/18; B32B 2307/7376; B32B 2307/304; G10K 11/168; G10K 11/161; F16L 55/033; F24F 13/0263
  See application file for complete search history.

(56) References Cited

U.S. PATENT DOCUMENTS

| | | | | |
|---|---|---|---|---|
| 5,183,079 | A * | 2/1993 | Blin | G02B 6/443 |
| | | | | 138/124 |
| 5,617,900 | A * | 4/1997 | Weil | F16L 59/00 |
| | | | | 138/110 |
| 5,849,379 | A * | 12/1998 | Gladfelter | F01N 13/14 |
| | | | | 428/36.1 |
| 6,653,568 | B1 * | 11/2003 | Davis | H02G 3/0481 |
| | | | | 248/68.1 |
| 8,061,477 | B2 | 11/2011 | Patel et al. | |
| 8,393,436 | B2 | 3/2013 | Tomerlin et al. | |
| 8,985,269 | B2 | 3/2015 | Barré | |
| 9,669,593 | B2 * | 6/2017 | Frantz | B29C 66/13 |
| 10,591,104 | B2 * | 3/2020 | Goulet | F01N 13/148 |
| 11,325,323 | B2 * | 5/2022 | Simon | B32B 5/26 |
| 11,739,973 | B2 * | 8/2023 | Vandyke | B32B 3/266 |
| | | | | 454/76 |
| 11,946,584 | B2 * | 4/2024 | Goulet | F16L 57/06 |
| 2005/0233129 | A1 | 10/2005 | Capoccello et al. | |
| 2018/0058771 | A1 * | 3/2018 | Butcher | F28F 1/12 |
| 2019/0120414 | A1 | 4/2019 | Palmer | |
| 2020/0056727 | A1 | 2/2020 | Maben et al. | |
| 2020/0056803 | A1 | 2/2020 | Vandyke et al. | |

\* cited by examiner

2200

INSTALL ACOUSTICALLY ABSORPTIVE AIR DUCT INTO ENVIRONMENTAL CONTROL SYSTEM — 2202

2300

INSTALL ACOUSTICALLY ABSORPTIVE AIR DUCT INTO ENVIRONMENTAL CONTROL SYSTEM — 2202

INSTALL ENVIRONMENTAL CONTROL SYSTEM INTO VEHICLE — 2302

ACOUSTIC AIR DUCT FOR ENVIRONMENTAL CONTROL SYSTEM IN VEHICLE

TECHNOLOGICAL FIELD

The present disclosure generally relates to the field of air ducts. More specifically, the present disclosure relates to the field of air ducts used in environmental control systems, and more specifically air ducts used in vehicular environmental control systems, including aircraft environmental control systems.

BACKGROUND

Vehicles, including, for example, aircraft, include environmental control systems that can deliver treated air to regions of an aircraft interior including, for example, regions within an aircraft cabin that can, for example, be inhabited by passengers. Treated air can include, for example, conditioned air, filtered air, etc. Treated air moving within air ducts within an environmental control system can generate a noise at levels that may contribute to a degree of passenger discomfort during, for example, a flight within an aircraft. Noise attenuating mufflers can be used to reduce noise generated by moving air within an environmental control system. However, noise attenuating mufflers can add weight, volume and cost to environmental control systems, particularly in environmental control systems found in large vehicle including, for example, aircraft.

Unless explicitly identified as such, no statement herein is admitted as prior art merely by its inclusion in the Technological Field and/or Background section.

SUMMARY

Present aspects are directed to an acoustically absorptive air duct including an air impervious inner layer, with the air impervious inner layer comprising an air impervious inner layer first side and an air impervious inner layer second side, a structural middle layer comprising a structural component, said structural middle layer comprising a structural middle layer first side and a structural middle layer second side, with the structural middle layer first side positioned adjacent the air impervious inner layer second side, with the structural middle layer comprising a plurality of through openings, and with the through openings cumulatively comprising a through opening area representing from about 30% to about 50% of a structural middle layer surface area. The acoustically absorptive air duct further includes an acoustically absorptive outer layer positioned adjacent the structural middle layer second side, wherein the structural middle structural layer is sandwiched between the air impervious inner layer second side and the acoustically absorptive outer layer to form an acoustically absorptive air duct.

In another aspect, the air impervious inner layer is an air impervious inner layer film.

In another aspect, the acoustically absorptive air duct outer layer further comprises an exterior covering layer, said exterior covering layer comprising a metallized polyetheretherketone-containing material.

In another aspect, the acoustically absorptive outer layer comprises a melamine-containing material.

In another aspect, the structural middle layer comprising a co-cured leno weave material.

In a further aspect, the co-cured leno weave material further includes a co-cured carbon fiber matrix epoxy resin-based material.

In another aspect, the air impervious inner layer is configured to co-cure with the co-cured carbon fiber matrix epoxy-resin-based material.

In another aspect, the structural middle layer comprises an additively manufactured thermoplastic component material or a thermoset component material.

In another aspect, the acoustically absorptive air duct further comprises an adhesive layer positioned between the structural middle layer and the air impervious inner layer.

In another aspect, the air impervious inner layer is a single ply film.

In another aspect, the air impervious inner layer comprises a plurality of plies.

In another aspect, the air impervious inner layer comprises an average thickness ranging from about of about 0.25 mil to about 1 mil.

In another aspect, the structural middle layer comprises an average thickness ranging from about 0.01 inch to about 0.03 inch.

In another aspect, the acoustically absorptive outer layer comprises an average thickness ranging from about 0.3 inch to about 0.6 inch.

A further present aspect is directed to an environmental control system including an acoustically absorptive air duct, with the acoustically absorptive air duct including an air impervious inner layer, with the air impervious inner layer comprising an air impervious inner layer first side and an air impervious inner layer second side, a structural middle layer comprising a structural component, said structural middle layer comprising a structural middle layer first side and a structural middle layer second side, with the structural middle layer first side positioned adjacent the air impervious inner layer second side, with the structural middle layer comprising a plurality of through openings, and with the through openings cumulatively comprising a through opening area representing from about 30% to about 50% of a structural middle layer surface area. The acoustically absorptive air duct further includes an acoustically absorptive outer layer positioned adjacent the structural middle layer second side, wherein the structural middle structural layer is sandwiched between the air impervious inner layer second side and the acoustically absorptive outer layer to form an acoustically absorptive air duct.

In another aspect, a vehicle includes the acoustically absorptive air duct presented herein.

In a further aspect, a vehicle includes the environmental control system that includes the acoustically absorptive air duct presented herein.

In another aspect, the vehicle is an aircraft.

Further present aspects are directed to a method for regulating sound by making an acoustically absorptive air duct, with the method including positioning an air impervious inner layer, that can be an air impervious inner layer film, onto a tool, with the air impervious film including an air impervious inner layer first side and an air impervious inner layer second side, with the air impervious inner layer including an air impervious inner layer first side positioned adjacent the tool. The method further includes positioning a structural component onto the air impervious inner layer second side, with the structural component comprising a structural component first side and a structural component second side, with the structural component first side positioned adjacent the air impervious inner layer second side, and with the structural component comprising a plurality of through openings cumulatively representing from about 30% to about 50% of the surface area of the structural component. The method further includes positioning an acoustically absorptive outer layer adjacent the structural component middle layer second side, wherein the structural component is sandwiched between the air impervious inner layer second side and the acoustically absorptive outer layer to form an acoustically absorptive air duct.

In another aspect, the air impervious film layer comprises a co-curable thermoplastic film layer and the structural component comprises a co-curable fiber-containing epoxy resin-based structural component.

In another aspect, before the step of positioning an acoustically absorptive outer layer adjacent the structural component second side, the method further includes co-curing the air impervious inner layer with the co-curable fiber-containing epoxy resin-based structural component.

Further present aspects are directed to a method for regulating sound in an aircraft environmental control system, with the method including installing an acoustically absorptive air duct into an aircraft environmental control system, with the acoustically absorptive air duct including an air impervious inner layer, that can be an air impervious inner layer film, with the air impervious inner layer comprising an air impervious inner layer first side and an air impervious inner layer second side, a structural middle layer comprising a structural component, with the structural middle layer including a structural middle layer first side and a structural middle layer second side, with the structural middle layer positioned adjacent the air impervious inner layer second side, and with the structural middle layer comprising a plurality of through openings that cumulative represent from about 30% to about 50% of the surface area of the structural middle layer. According to the method, and according to present aspects, the acoustically absorptive air duct further includes an acoustically absorptive outer layer positioned adjacent the structural middle layer second side, with the middle structural layer is sandwiched between the air impervious inner layer second side and the acoustically absorptive outer layer to form an acoustically absorptive air duct.

In another aspect, the air impervious film layer includes a co-curable thermoplastic film layer and the structural component includes a co-curable fiber-containing epoxy resin-based structural component.

In another aspect, before the step of positioning an acoustically absorptive outer layer adjacent the structural component second side, the air impervious inner layer is co-cured with the co-curable fiber-containing epoxy resin-based structural component.

The features, functions and advantages that have been discussed can be achieved independently in various aspects or may be combined in yet other aspects, further details of which can be seen with reference to the following description and the drawings.

BRIEF DESCRIPTION OF THE DRAWINGS

Figure 1:
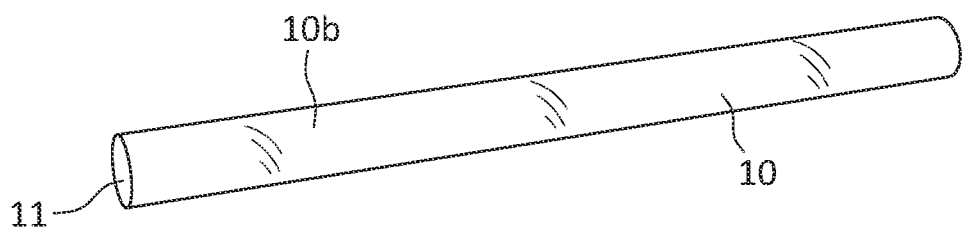
Figure 2A:
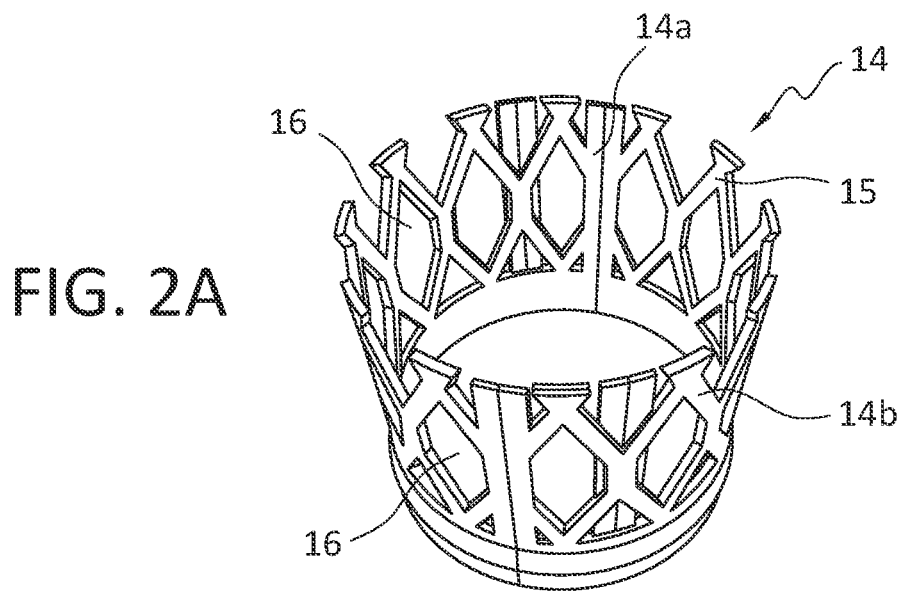
Figure 2B:
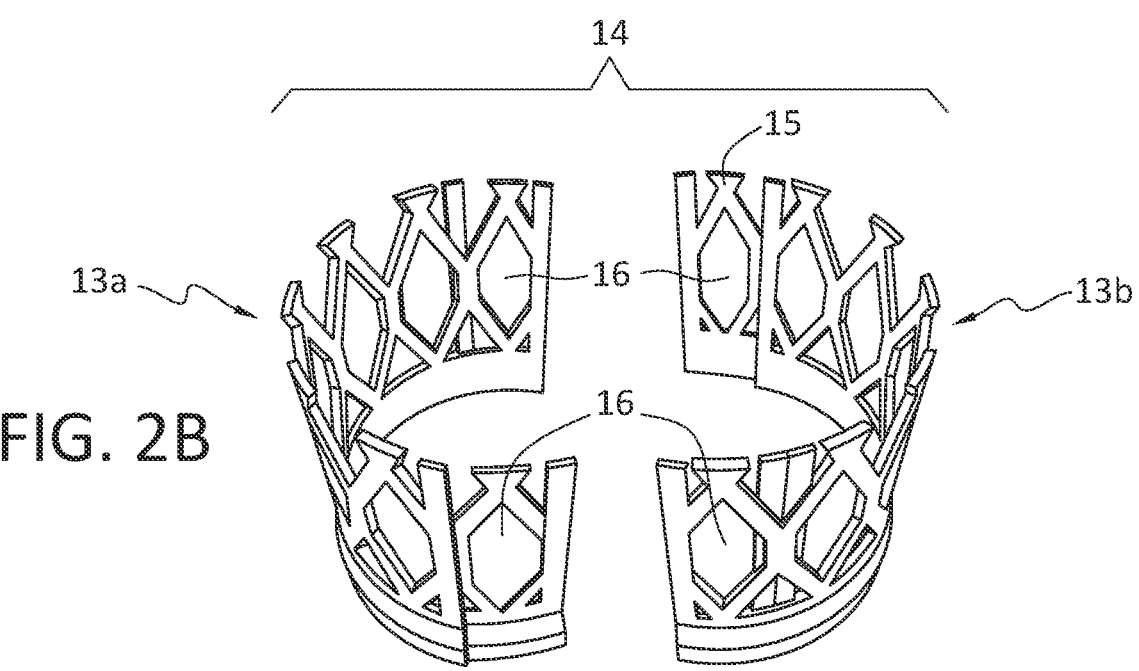
Figure 3:
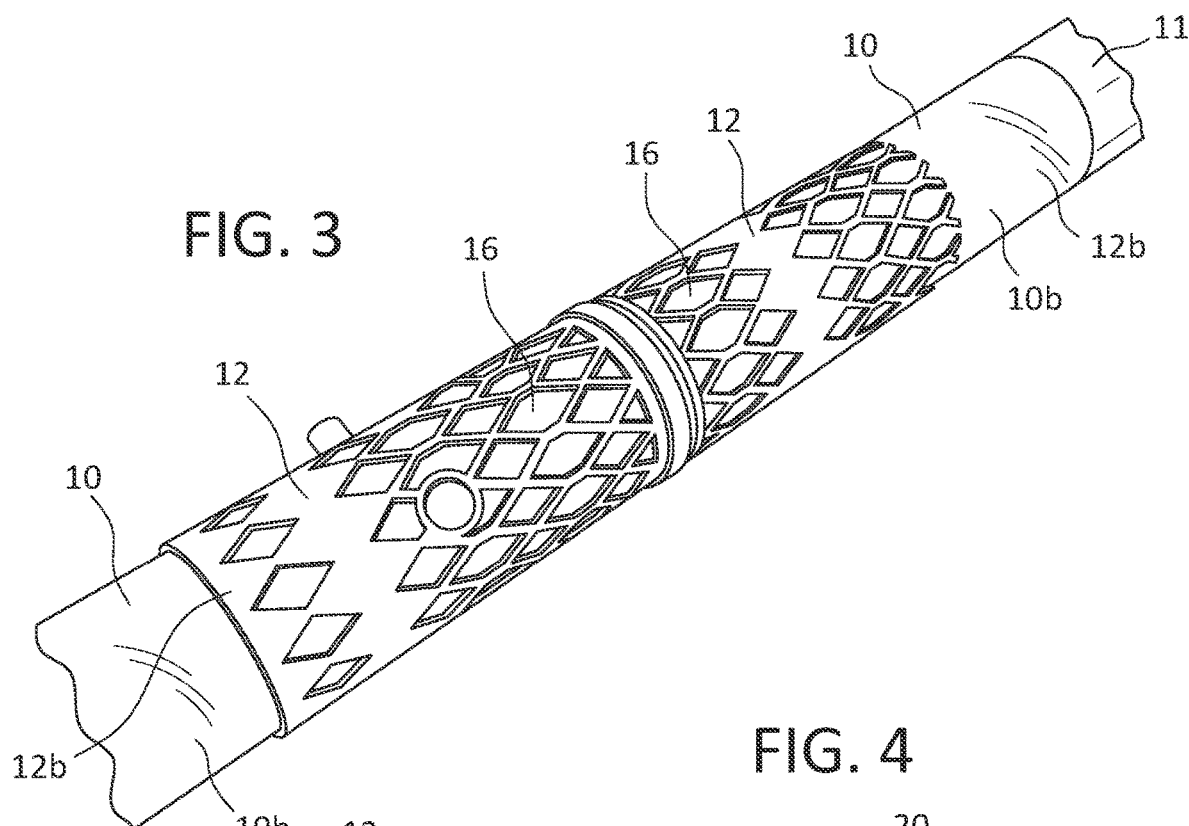
Figure 4:
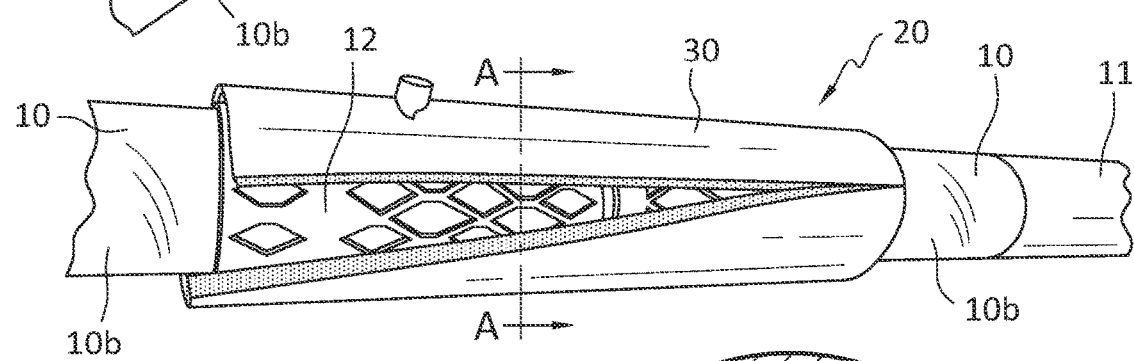
Figure 5:
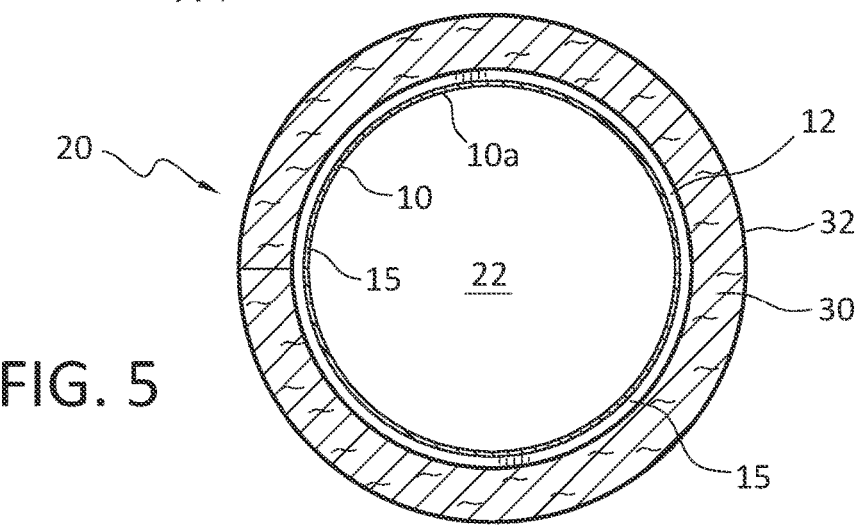
Figure 6A:
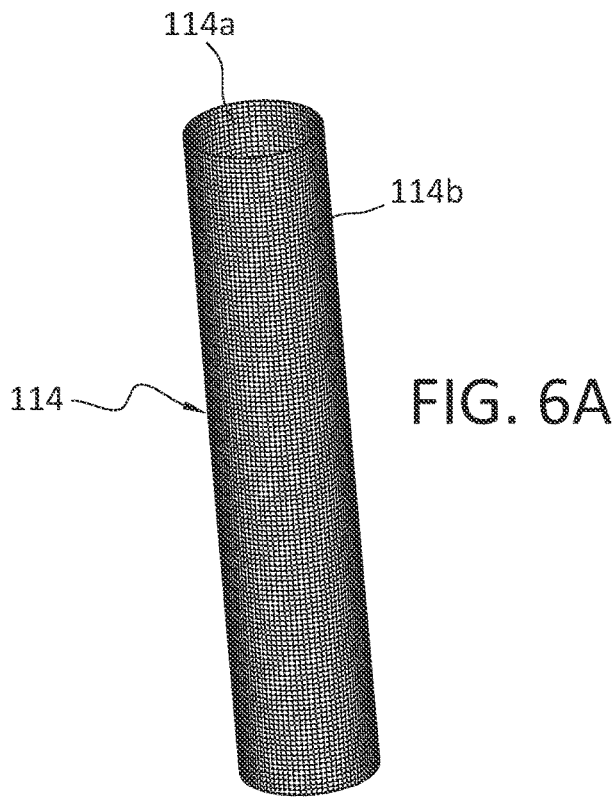
Figure 6B:
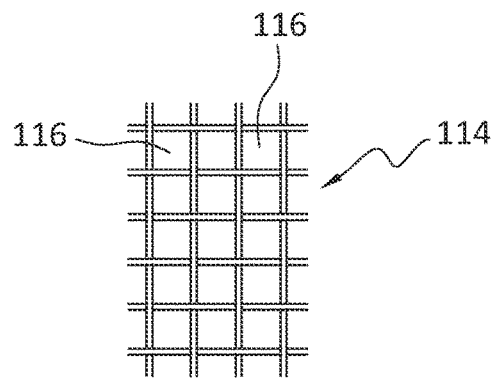
Figure 7:
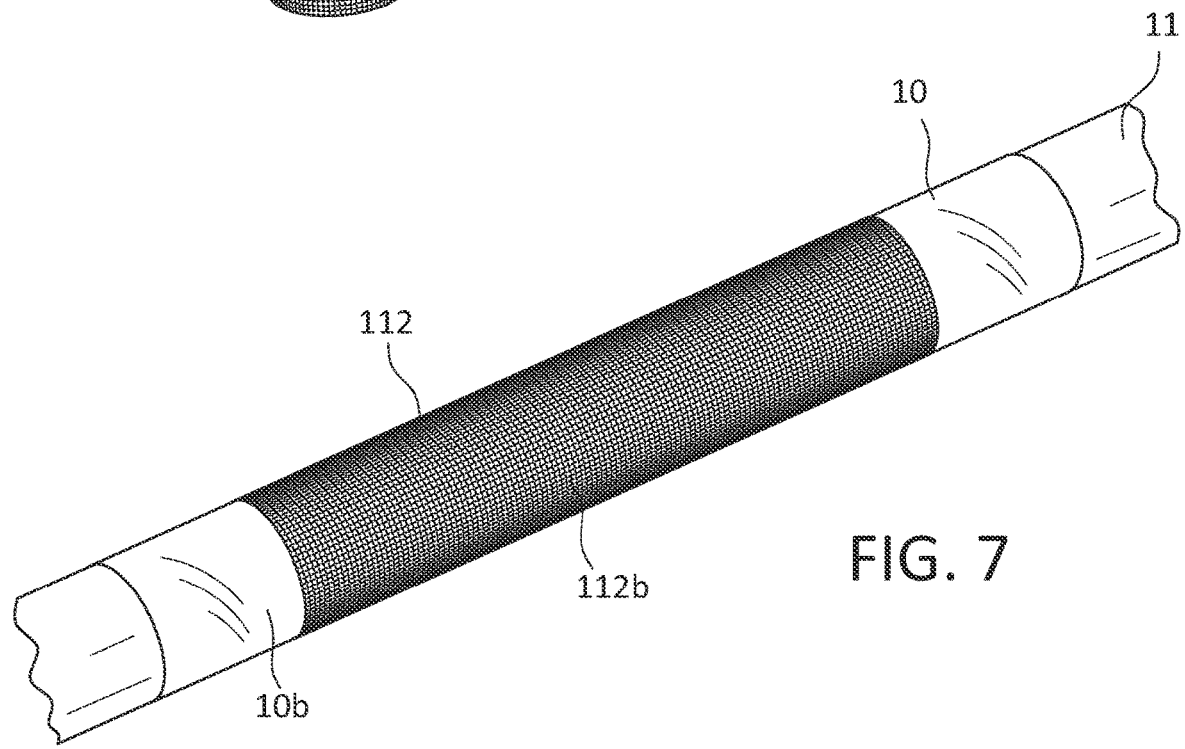
Figure 8:
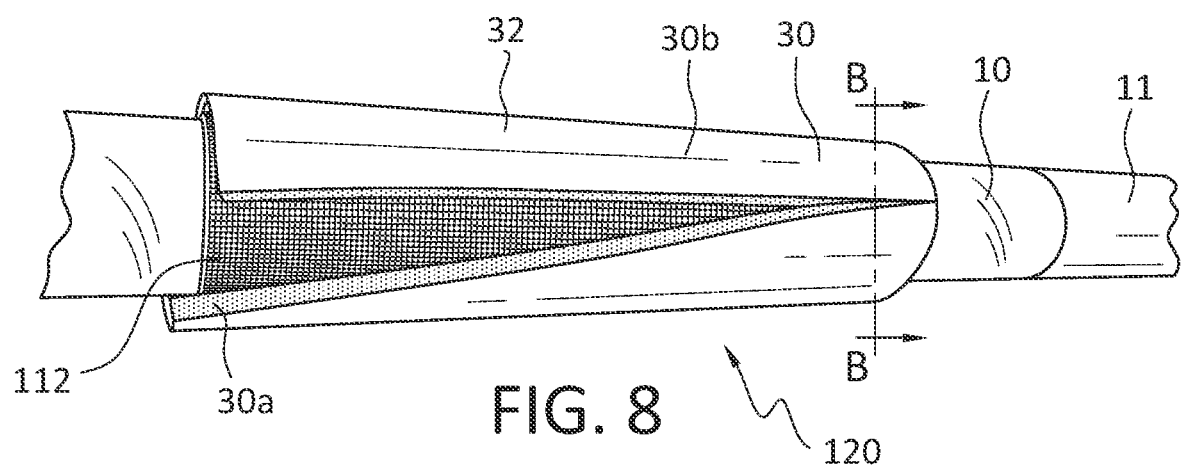
Figure 9:
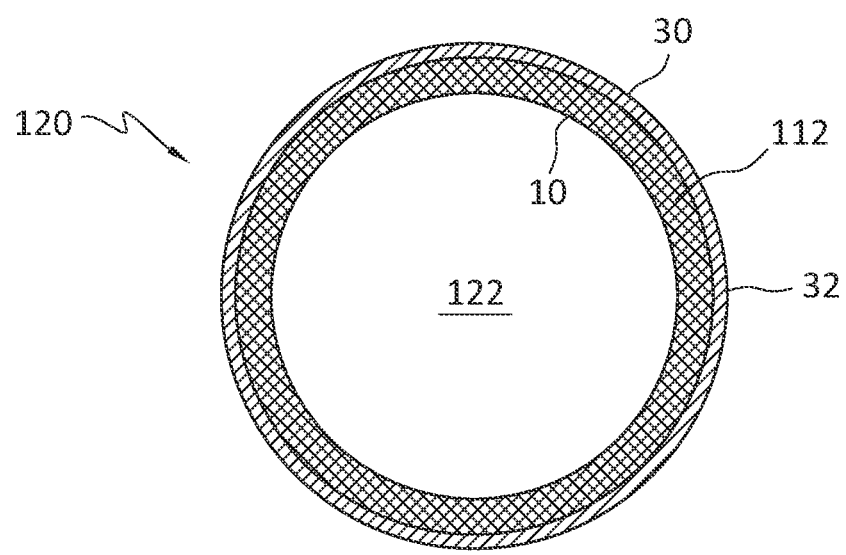
Figure 10:
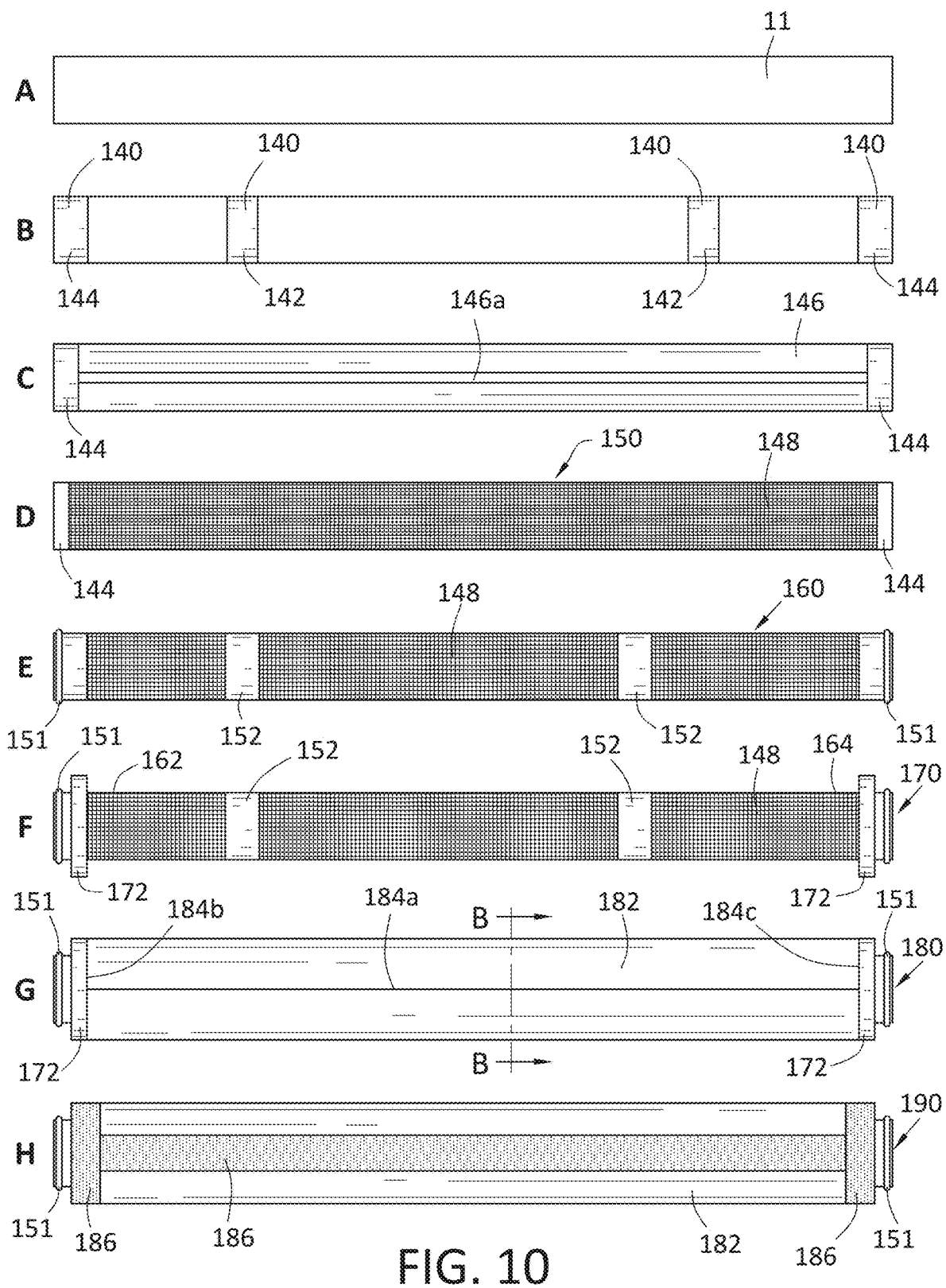
Figure 11:
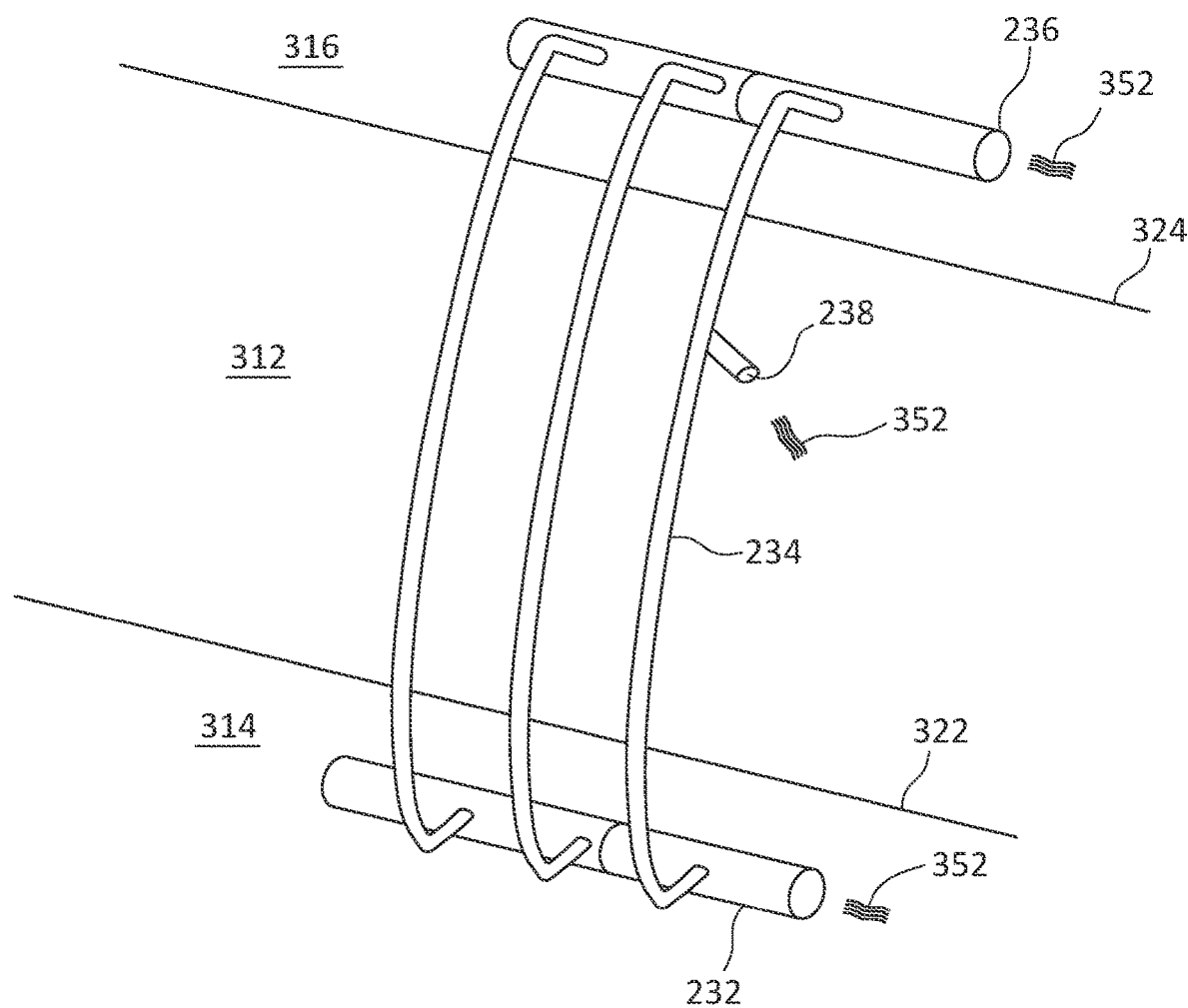
Figure 12:
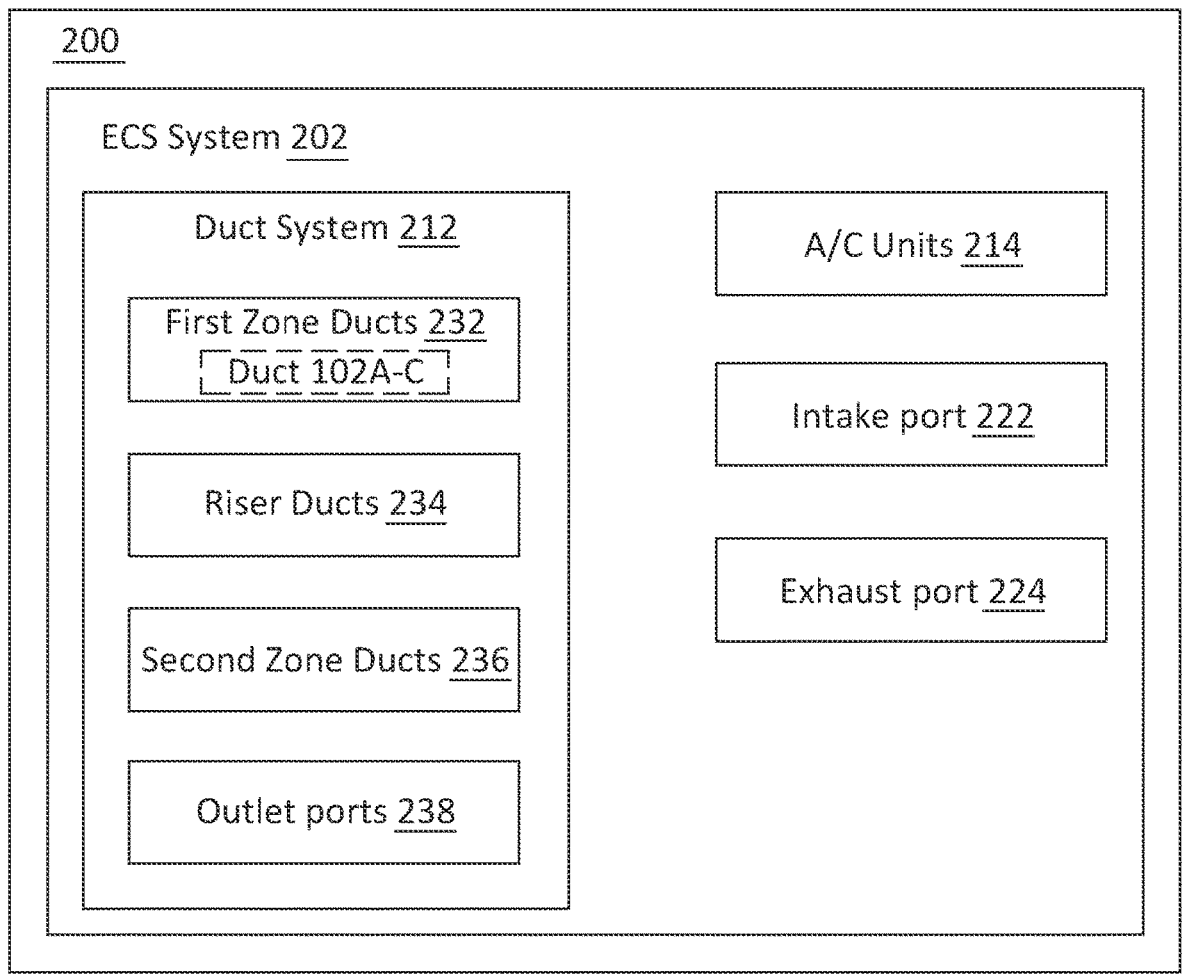
Figure 13:
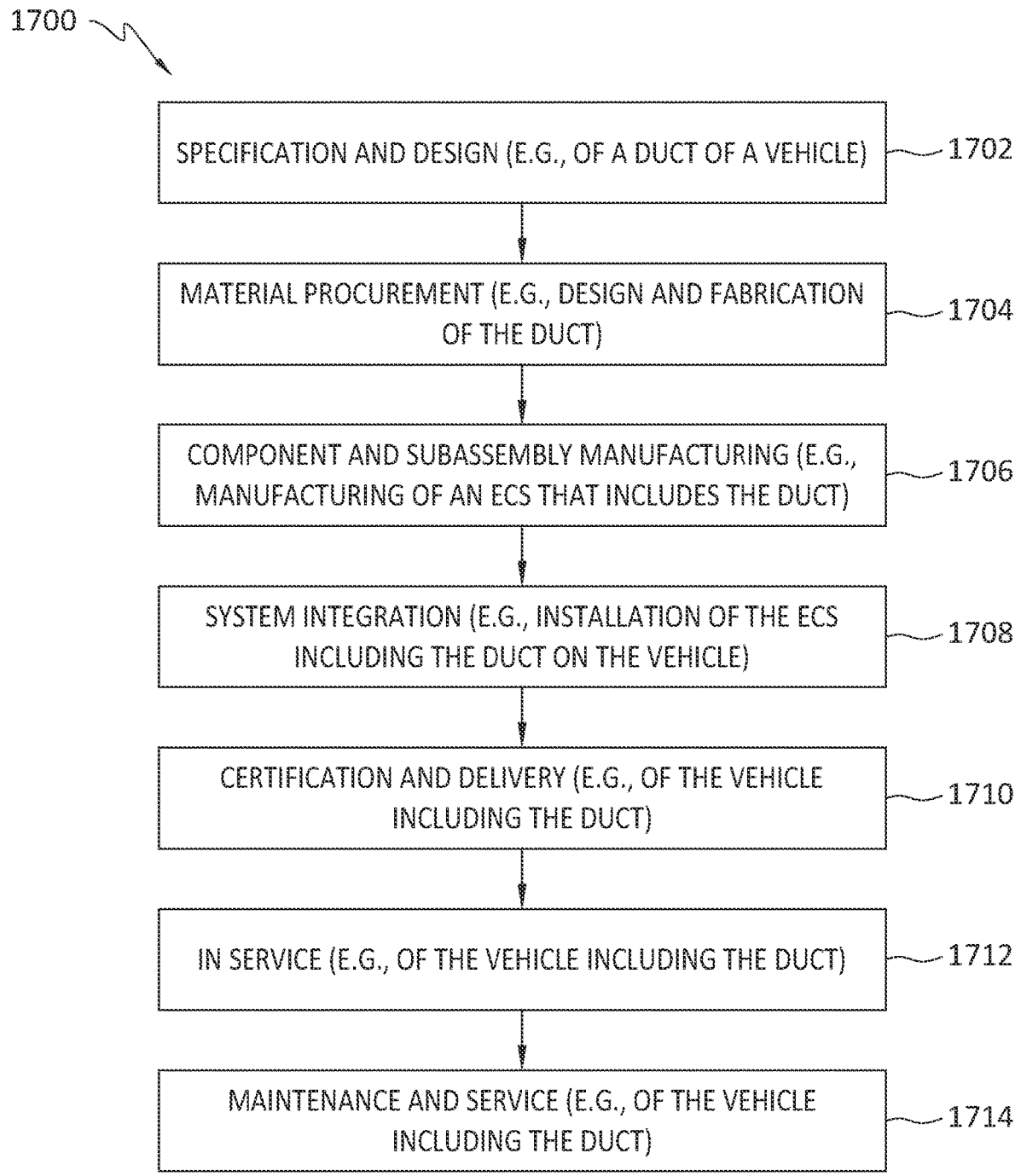
Figure 14:
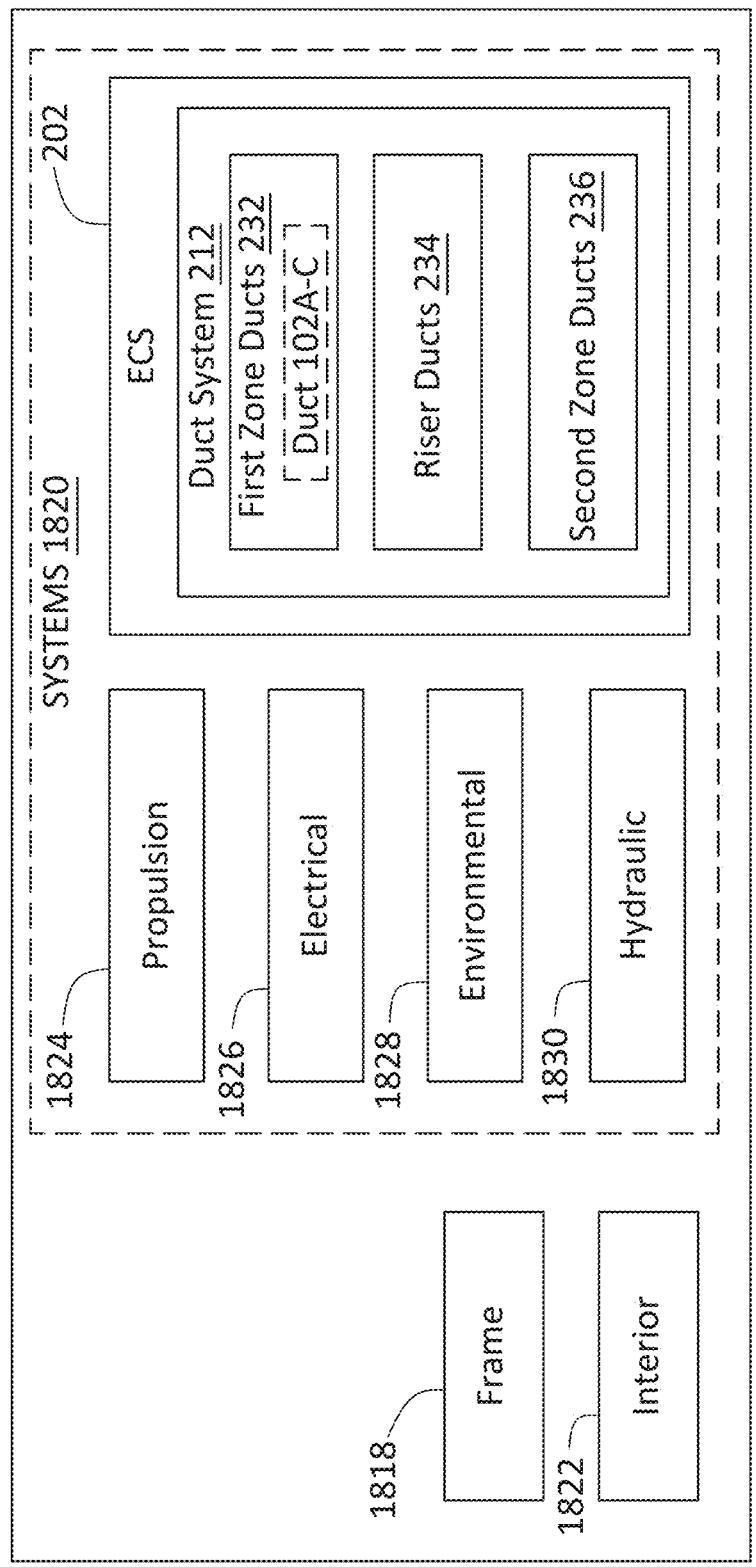
Figure 15:
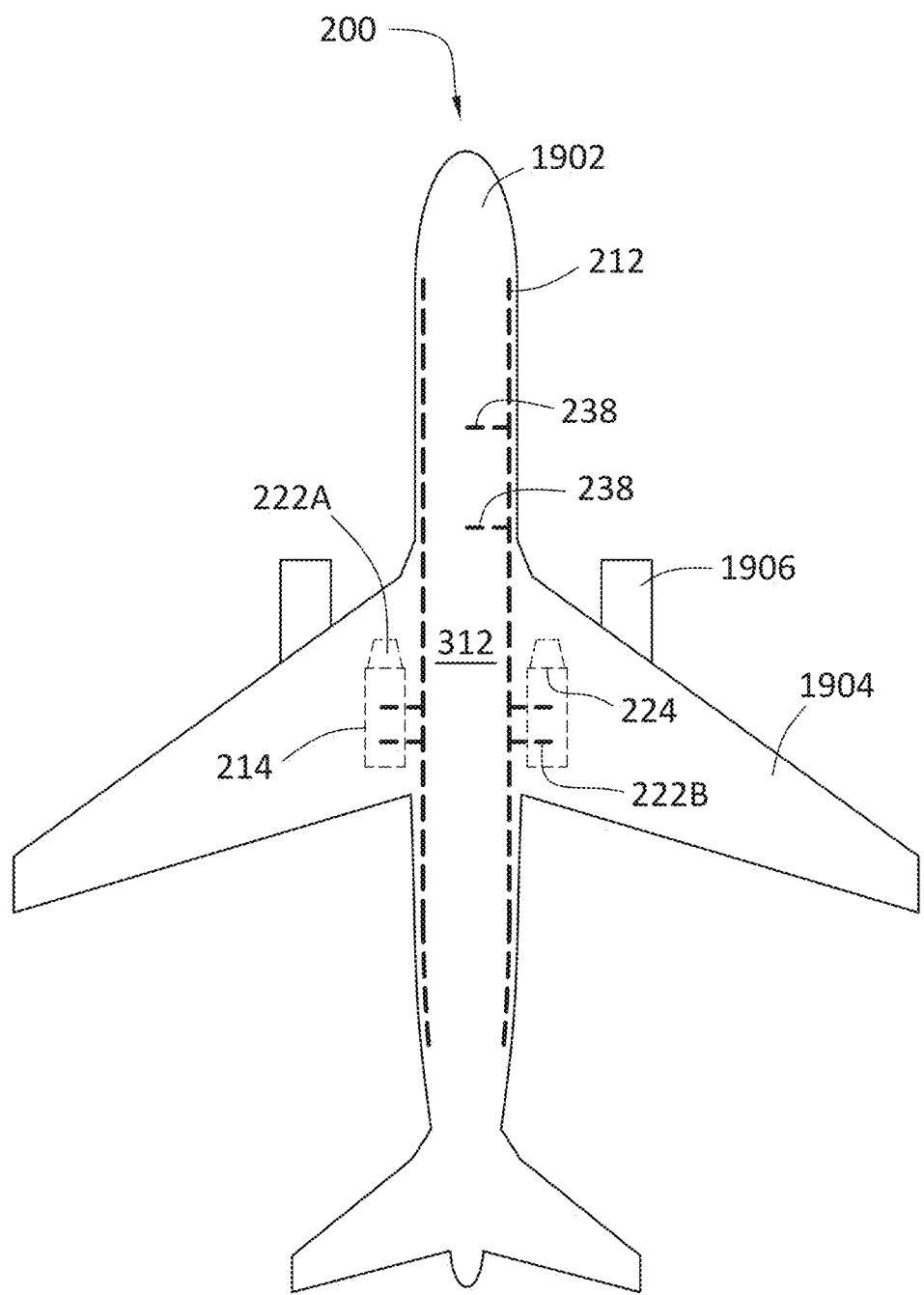
Figure 16:
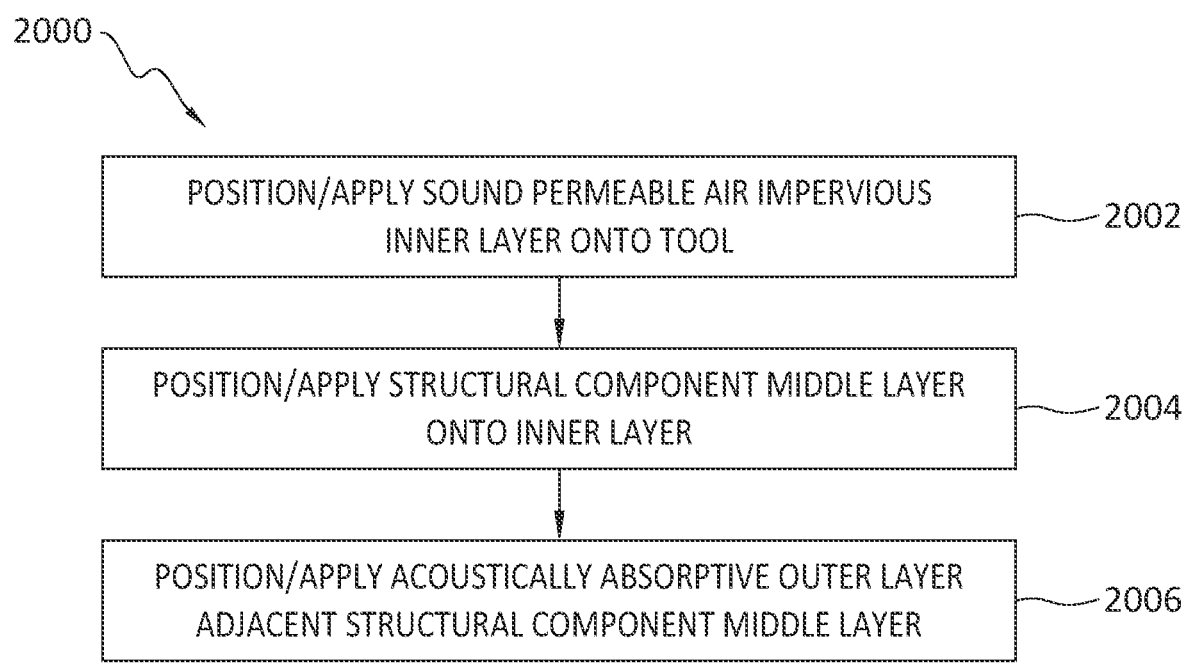
Figure 17:
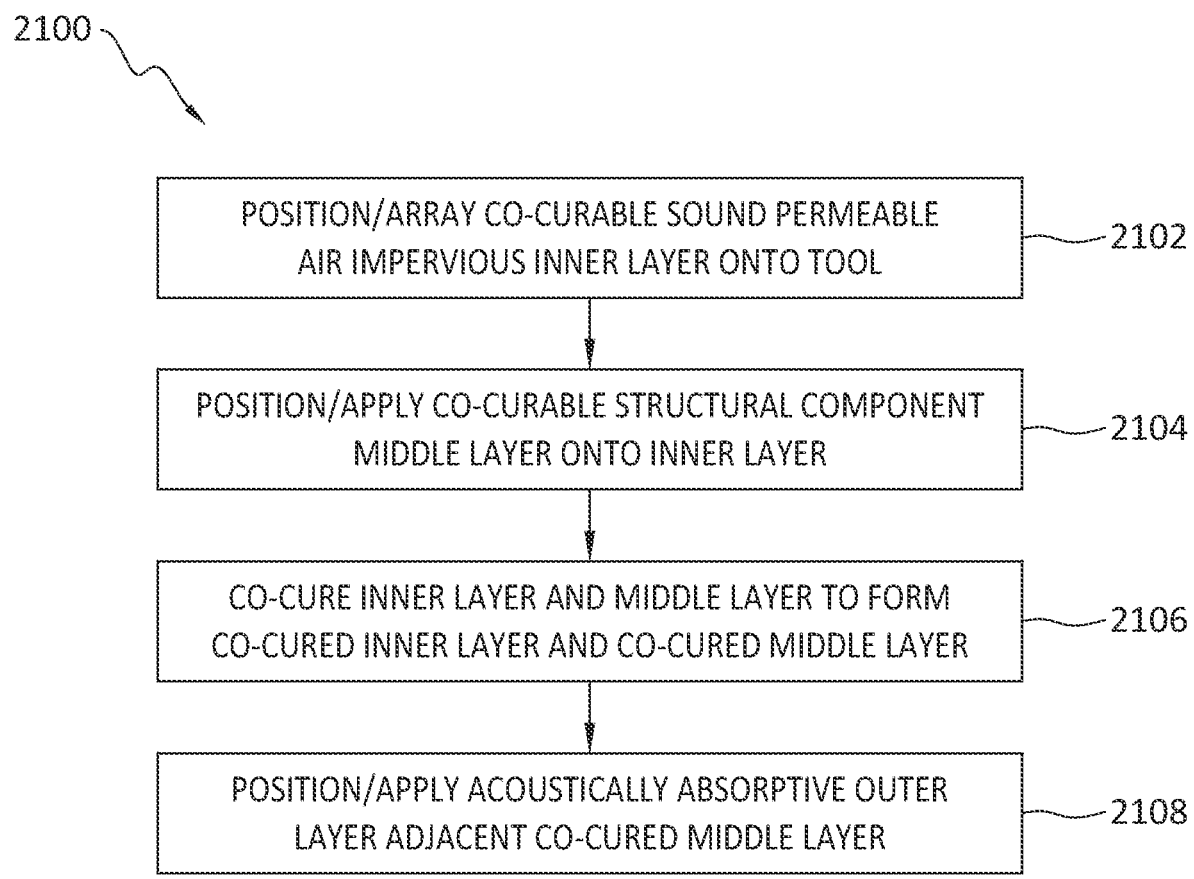
Figures 18, 19:

Having thus described variations of the disclosure in general terms, reference will now be made to the accompanying drawings, which are not necessarily drawn to scale, and wherein:

FIG. 1 is an illustration of an inner film layer of a partial air duct construction mounted on a cylindrical tool, according to a present aspect;

FIG. 2A is an illustration of a plurality of structural middle layer components shown in a semi-circular configuration, according to a present aspect;

FIG. 2B is an illustration of structural middle layer components of the type shown in FIG. 2A joined together, according to a present aspect;

FIG. 3 is an illustration of a partial air duct construction, according to a present aspect;

FIG. 4 is an illustration of an air duct construction showing an acoustically absorptive outer layer positioned adjacent the structural component, according to ap present aspect;

FIG. 5 is a cross sectional view of the air duct construction shown in FIG. 4, according to a present aspect;

FIG. 6A is an illustration of a structural component, according to a present aspect;

FIG. 6B is a close-up view of the structural component of FIG. 6A;

FIG. 7 is an illustration of a partial air duct construction, according to a present aspect;

FIG. 8 is an illustration of an air duct construction showing an acoustically absorptive outer layer positioned adjacent the structural component, according to ap present aspect;

FIG. 9 is a cross-sectional view of the air duct shown in FIG. 8, according to a present aspect;

FIG. 10 is a series of illustrations showing an exemplary progression of a manufacture of an air duct, according to present aspects;

FIG. 11 is a representative view of an exemplary environmental control system, according to a present aspect;

FIG. 12 is a block diagram of an aircraft that includes an example of an environmental control system of the type shown in FIG. 11, according to present aspects;

FIG. 13 is a flowchart outlining methods according to present aspects;

FIG. 14 is a block diagram that illustrates an example of a vehicle including the air duct, according to present aspects;

FIG. 15 is an overhead plan view of a representative aircraft including the environmental control system of FIG. 12, according to present aspects;

FIG. 16 is a flowchart outlining methods according to present aspects;

FIG. 17 is a flowchart outlining methods according to present aspects;

FIG. 18 is a flowchart outlining methods according to present aspects; and

FIG. 19 is a flowchart outlining methods according to present aspects.

DETAILED DESCRIPTION

According to present aspects, an air duct in the form of an acoustic air duct assembly, and methods of manufacture and installation into a larger structure that can be, for example, a vehicle, including an aircraft, are disclosed. Such disclosed acoustic air ducts can be incorporated into environmental control systems, including environmental control systems for aircraft disclosed herein, and can function as, and obviate the need for, a noise attenuating muffler for reducing sound generated in the air ducts of, for example, environmental control systems residing in vehicles including, for example, aircraft.

Presently disclosed acoustic airducts are configured to improve sound attenuation by cancelling, absorbing, and/or redirecting noise generated by, for example, airflow that is directed through a ducted system within a large object including, for example, vehicles, such as, for example, aircraft. In such large object airflow systems, referred to equivalently herein as environmental control systems (ECS), fresh, and/or treated, and or conditioned air can be directed along and through pathways via ducts. The noise that is generated as a by-product of the air's directional movement and "drive" through a ducted system has, in the past, been attenuated via mufflers and system components that are added to ductwork, and that add commensurate weight and further increase system complexity and cost.

In contrast, present aspects are directed to the construction, installation, and operation, etc. of acoustic air ducts for environment control systems (ECS), with such acoustic air ducts and environmental control systems requiring no additional muffler-type (and obviating the presence of any additional and distinct) components. The presently disclosed acoustic air ducts (referred to equivalently herein as "acoustically absorptive air ducts") attenuate (e.g., cancel and/or absorb, etc.) and redirect noise from the ECS to a selected and tunable decibel level that at least matches and/or exceeds the performance of previous noise attenuation solutions, while realizing a significant cost savings, weight savings, and space (e.g., "footprint") savings due to a specified multi-layer acoustic air duct construction for use within an environmental control system of a large object such as, for example, an aircraft. The combination of components, along with the selected component layer construction disclosed herein combine to afford the presently disclosed acoustic air ducts with significantly improved performance, robustness, and efficiency of both the acoustic air ducts that are produced, with the improved acoustic air ducts significantly improving the performance, robustness, and efficiency of the environmental control systems that incorporate such acoustic air ducts.

In addition, technical effects of aspects described herein enable an environmental control system to be lighter, smaller, use less material in the construction, and realize a decrease in individual material layer thicknesses, a decrease in total duct wall thickness, and realize a smaller duct "footprint", realize an increase in system efficiency, realize decreased maintenance, and/or result in less total manufacturing, installation, and maintenance expense than ducts that do not incorporate one or more of the disclosed aspects. Accordingly, vehicles (e.g., aircraft, etc.) that include such environmental control systems, including environmental control systems modified to include the presently disclosed acoustic ducts, can be lighter, smaller and/or less expensive to manufacture, retrofit, maintain, rework, etc.

According to a present aspect, FIGS. 1, 2, 3, 4, and 5 illustrate the component layers of presently disclosed acoustic air ducts. FIG. 1 shows a perspective view of an air impervious inner layer film 10, that can be a single ply of film disposed onto a mold or tool 11. The air impervious inner layer film 10 can be a thermoplastic material, and can be polyetheretherketone material, with such material applied to the tool as a single ply film or as a multi-ply film. Such air impervious inner layer film 10 is configured to be an innermost layer for the eventual acoustic air duct construction, with the air impervious inner layer film 10 comprising an air impervious inner layer film first side 10a (e.g., an inner surface or side) that is not visible in FIG. 1, and an air impervious inner layer film second side 10b (an outer surface or side).

According to a present aspect, the average thickness of the air impervious inner layer film 10 ranges from about 0.25 mil to about 1·mil. That is, when the air impervious inner layer film 10 is a single ply, the single ply will have an average thickness that ranges from about 0.25 to about 1 mil. When the air impervious inner layer film 10 comprises a plurality of plies to form a multi-ply air impervious inner layer film, the average thickness of the air impervious inner layer film 10 having multiple plies (e.g., a plurality of plies) preferably has an overall inner layer average thickness ranging from about 0.25 to about 1 mil.

According to present aspects, the air impervious inner layer that can be a film, can be a polyetheretherketone material that can be in a film form. In an alternate aspect, the air impervious inner layer can be a metallized polyetheretherketone (PEEK) material that can be in a film form, and that can comprise embedded reinforcement fibers. Further alternate materials for use in as the air impervious inner layer can include, polyvinyl fluoride (PVF), polyetherketone ketone (PEKK), polyphenyl sulfone (PPS), ethylene chlorofluoroethylene (ECTFE). The air impervious inner layer can further be made from as thermoplastic material that can be configured into film form, and that meets general aerospace environmental requirements.

FIGS. 2A and 2B show a rigid structural component 14 that, when integrated into the presently disclosed acoustic air duct assembly, is configured as the structural middle layer 12 of the acoustic air duct 20 (shown at least in FIG. 5 in a cross-sectional view, and FIG. 4 as a partially exposed view). As shown in FIG. 2A, structural component 14 comprises a structural component first side 14a (e.g., structural component "inner" side) and a structural component second side 14b (e.g., structural component "outer" side). The structural component 14 is shown comprising a plurality of through openings 16 in the structural component walls such that, according to present aspects, the total area of the cumulative through openings represents a total through opening area equivalent to from about 30% to about 50% of the total surface area of the structural component 14 (e.g., the cumulative area of the through openings representing from about 30% to about 50% of a similarly dimensioned and hypothetically "solid" structural component that does not have through openings, etc.). Stated another way, the total area of "voids" or open spaces through the walls of the structural component represents an amount of area equivalent to from about 30% to about 50% of the structural material area.

According to present aspects, the terms "rigid structural member" are "rigid structural component" are used equivalently herein. A rigid structural member will maintain its shape at peak operating pressures and temperatures exerted on a rigid structural member by, for example, an environmental control system in operation. The rigid structural member further cannot be manipulated under hand applied loads.

According to present aspects, the terms "semi-rigid structural member" and "semi-rigid structural component" are used equivalently herein. A semi-rigid structural member will maintain its shape at peak operating pressures and temperatures exerted on a semi-rigid structural member by, for example, an environmental control system in operation. The semi-rigid structural member can be manipulated under hand applied loads.

According to present aspects, the structural component 14 as shown in FIG. 2A can be configured to comprise a plurality of structural component segments 13a, 13b shown in FIG. 2B, such that structural components 13a, 13b can be joined together to form the structural component 14. Present aspects contemplate the usefulness of manufacturing a structural middle layer (also referred to equivalently herein as an "endoskeleton layer") configured to facilitate encasing the air impervious inner layer film with a structural component that can comprise multiple segments that each partially encase a section of the inner layer, and that, when joined together (to form a completed structural material component), the plurality of structural component segments represents a completed structural component that also forms a structural middle layer having through openings that, according to a present aspect, is configured to substantially completely encase the air impervious inner layer.

FIG. 2A further shows an adhesive layer 15 (e.g., that can be an adhesive layer (that can be, for example, an adhesive film layer, an adhesive resin layer, an adhesive layer that is brushed onto a surface, an adhesive layer that is sprayed onto a surface, and/or combinations thereof, etc.) that can be applied to or otherwise deposited onto one or more of the structural component first and/or second sides 14a, 14b, respectively. The adhesive layer 15 can be a pressure-sensitive adhesive layer comprising a pressure-sensitive adhesive material. The adhesive layer 15 can comprise an adhesive material that is co-curable with the air impervious inner layer film 10. According to present aspects, and as shown in FIGS. 2A and 2B, the structural component 14 can be a thermoplastic or thermoset material, and further can be a material that can be additively manufactured. The structural component when configured as the structural middle layer in the acoustically absorptive air ducts disclosed herein can have a middle layer thickness in the air duct construction ranging from about 0.01 inch to about 0.03 inch, according to present aspects.

The structural component 14 shown in FIGS. 2A, 2B is shown to have a substantially circular cross-sectional geometry conducive to forming the structural component in the form of a structural middle layer for the presently disclosed acoustic air duct that, for example, can be a substantially tubular air duct. Present aspects further contemplate the presently disclosed air ducts having any selected internal and/or external cross-sectional geometry including for example, a rectangular, hexagonal, octagonal, elliptical, etc. cross-sectional geometry, such that the structural middle layer comprising the structural component can also comprise a matching selected cross-sectional geometry including, for example, a rectangular, hexagonal, octagonal, elliptical, etc., cross-sectional geometry. Further, the inner and outer cross-sectional geometries of the present acoustic air duct structural component and of the completed acoustic air duct assemblies can be configured to be the same or different.

FIGS. 3, 4, and 5 further illustrate the acoustically absorptive air ducts as presently disclosed, including further illustrating aspects of their construction and the combined layers that are configured in combination. As shown in FIG. 3, a tool 11 that can be, for example, a solid substantially longitudinally cylindrical mandrel, etc.) is first enveloped (e.g., "covered") by an air impervious inner layer film 10, with the air impervious inner layer film first side 10a (not visible in FIG. 3) positioned adjacent the tool 11. The air impervious inner layer film second side 10b is then positioned in intimate contact with the structural middle layer first side 12a (e.g., the structural component "inner" side) of the structural middle layer 12, with structural middle layer second side 12b (e.g., the structural component "outer" side) visible. According to present aspects, as shown in FIG. 3, the structural middle layer 12 (that may comprise multiple structural component segments, as shown in FIG. 2B as segments 13a, 13b, for example) is configured to intimately contact and otherwise completely surround and/or envelope the air impervious inner layer film 10. If desired, an adhesive layer 15 (that can be, for example, in the form of an adhesive layer film) can be placed over and otherwise in intimate contact with the structural middle layer second side 12b. Further, if desired, the structural middle layer first side 12a (that is configured to contact the air impervious inner layer film second side 10b) may also comprise an adhesive layer 15 that can be, for example, in the form of an adhesive layer film.

The substantially cylindrical dimension of the tool 11 facilitates the formation and manufacture and assembly of the acoustic air duct assembly such that the acoustic air duct is configured into a geometry that represents the geometry of the tool 11. That is, for example, by sequentially wrapping the component acoustic air duct component layers onto the cylindrical tool 11, the resulting component layers acquire a longitudinally cylindrical form that can be a substantially cylindrical tubular form along the longitudinal axis, with the elongate tubular form and shape retained by the air duct, even after the multi-layered acoustic air duct is removed from the tool 11.

FIG. 4 is a partially exposed view (and just prior to completion) of a nearly completed acoustic air duct 20, according to present aspects, with an acoustically absorptive outer layer 30 having an acoustically absorptive outer layer first (e.g., "inner") side 30a (configured to intimately contact and otherwise completely surround and/or envelope the structural middle layer second side 12b) and an acoustically absorptive outer layer second (e.g., "outer") side 30b. As shown in FIG. 4, the acoustically absorptive outer layer can incorporate or otherwise support an outer protective layer 32.

FIG. 5 is a cross-sectional view of the completed acoustic air duct 20 of the type shown in FIG. 4, taken along line A-A, with the understanding that the acoustically absorptive outer layer 30 is configured to completely surround and/or envelope the structural component 12, and that the entire formed acoustic air duct 20 has been removed from the tool 11 As shown in FIG. 5, acoustic air duct 20 is configured to retain a substantially tubular shape as evidenced by the substantially circular geometry along the longitudinal axis of the acoustic air duct 20. An acoustic duct pathway 22 is maintained along and within the length of the acoustic air duct 20, with the acoustic air duct comprising a multi-layered construction as described herein, and where the air impervious inner layer film first side 10a of the air impervious inner layer film 10 establishes an immediate boundary for the acoustic air duct pathway 22.

As shown in FIG. 5, structural middle layer 12 surrounds the air impervious inner layer film 10, and the acoustically absorptive layer 30 surrounds the structural middle layer 12, with the structural middle layer 12 configured to provide a rigid and load-bearing "endoskeleton" to the acoustic air duct 20, and with the structural component configured to be a structural middle layer 12 sandwiched between the air impervious inner layer film 10 and the acoustically absorptive outer layer 30. An adhesive layer 15 (that can be, for example, an adhesive layer film) can be applied to either or both sides of the structural middle layer. As further shown in FIG. 5, the acoustically absorptive outer layer 30 can comprise a protective outer coating 32 that can be integral with the acoustically absorptive outer layer 30, or that alternately can be a separate protective outer layer that is applied to the acoustically absorptive outer layer 30.

According to present aspects, the structural component that is incorporated into the presently disclosed acoustic air duct assemblies to be the structural middle layer "endoskeleton" can be of the type of rigid structural component that can be made from a robust and light-weight material including thermoset and thermoplastic materials, further including materials that can be additively manufactured. Additionally, the structural component incorporated to form the acoustic air duct structural middle layer can be made, for example, from thermoset materials including, for example, woven fiberglass, carbon fiber, Kevlar fiber (e.g., leno weave style), with the selected fiber matrix in combination with a phenolic resin material or an epoxy resin material.

As shown at least in FIGS. 2A, 2B, 3, and 5, present aspects contemplate including an adhesive material layer to form an adhesive layer 15 on the structural middle layer first side and/or the structural material second side. The adhesive material layer can comprise a pressure sensitive adhesive and can be applied to the structural middle layer first and/or second side before introducing the structural component to the air impervious inner layer film, to form the structural middle layer in the presently disclosed acoustic air ducts.

According to present aspects, the term "middle" refers to an "interior" layer and does not connote a mathematical "middle" or a spatial "middle" layer where an equivalent number of layers exist on either side of the structural component (e.g., the structural middle layer). That is, present aspects contemplate that the structural middle layer can adjoin one or more layers on either side of the structural middle layer, and the number of inner layers on the inner side of the structural middle layer can be the same or different than the number of outer layers of materials and material types present on the outer side of the structural middle layer, and the inner and outer layers can have the same or different thicknesses from one another and can be the same or different than the thickness of the structural middle layer.

According to present aspects, the overall weight and density of the presently disclosed acoustic air ducts and air duct component layers is of prime consideration, such that a very thin inner layer (e.g., inner layer thickness ranging from about 0.25 mil to 1 mil), a thin structural middle layer (thickness ranging from about 0.1 inch to about 0.3 inch), and a relatively thin acoustically absorptive layer (thickness ranging from about 0.3 inch to about 0.6 inch) is achieved and preferred.

According to a further present aspect, the structural middle layer comprising the structural component can made from a material that is rigid or semi-rigid, and that can be made from a co-curable material that can be co-cured, for example, with the air impervious inner layer that can be a co-curable material that is selected to co-cure with the selected co-curable structural component that can be configured to be the co-cured structural middle layer.

The presently disclosed very thin air impervious inner layer film (e.g., ranging in average film thickness from about 0.25 to about 1 mil, and preferably about 0.25 mil thick) is configured to prevent air leakage from the duct pathway through the air impervious inner layer film, and maintain pressure (e.g., air pressure within the duct system, etc.), while minimizing blockage of sound transmitted through the duct to the acoustically absorptive outer layer (e.g., the outer duct layer that can be, for example, a foam layer, etc.).

According to present aspects, the air impervious inner layer film has a very thin average film thickness that provides minimal rigidity characteristics, if at all, to the overall acoustic air duct assembly. Rather, the air impervious inner layer film completely lines the inside of the duct pathway, and is completely supported by and otherwise retains a dimensional configuration that is supported and retained in place by the structural component alone or in combination with the outward positive pressure supplied to the air duct by environmental control systems and/or other systems controlling and directing air flow through the presently disclosed ducts.

That is, according to present aspects, the air impervious thin inner layer film first side (e.g., innermost side) is configured to line the inner wall of the present acoustic air ducts and is in direct contact with an air flow through the acoustic air duct. By placing the structural component in contact with and against the air impervious inner layer film second side (e.g., outer side), under system pressure, the air impervious inner layer is dimensionally forced or otherwise driven "outwardly" in a direction away from (e.g., perpendicular to) the air flow through the duct, and otherwise in an outward direction away from the center of the acoustic air duct. According to present aspects, when the air flow system or environmental control system, etc., is operational, the present air impervious inner layer film of the present acoustic air duct sustains an outwardly directed force from the positive pressure exerted within the air duct, and the air impervious inner layer film directs such outward force against the rigid structural component.

According to further present aspects, further advantages are realized by the present acoustic air ducts relating to air purification or treatment, clean or treated air distribution, and air flow distribution efficiency and overall environmental control system cleanliness. Within large vehicles employing the present apparatuses, systems, and methods, impurities occurring within an air flow within an environmental control system of, for example, a vehicle can accumulate within air ducts. According to present aspects, the air impervious inner layer film first side (e.g., the innermost side adjacent the air flow through the acoustic air duct and "bounding" the acoustic air duct pathway) can be selected or treated to possess smooth surface characteristics to which impurities and ambient particulates (including, for example, some bacteria, fungi, viruses, etc.) will not attach.

The "smoothness" characteristics of the air impervious inner layer film first side can further include surface characteristics that can include the configuration of surface patterns present on the air impervious inner layer film first side surface such as, for example "shark skin" or other surface patterns and surface characteristics (including, for example, biomimicry of surfaces) that make particle adhesion (including, e.g., bacterial, fungal, viral, etc. adhesion and growth) to a surface difficult or nearly impossible. The inclusion of selected surface characteristics on the air impervious inner layer film first side facilitate maintaining the surface cleanliness of the air duct inner surface, reducing the need to clean ducts, and reducing or significantly extending the time between scheduled air duct maintenance, cleaning, repair, replacement, reworking, etc. Accordingly, the present acoustic air ducts further contributing to a selected level of air cleanliness and air freshness throughout an environmental control system incorporating the present acoustic air ducts, as well as the cleanliness of air circulated through vehicles comprising the present acoustic air ducts.

FIGS. 6A, 6B, 7, 8, 9, and 10 illustrate an alternative structural component and structural middle layer to be used, according to alternate present aspects, in the manufacture of the presently disclosed acoustic air ducts, acoustic air duct assemblies, acoustic air duct segments, environmental control systems comprising the acoustic air ducts, and larger structures (e.g., including aircraft) that comprise the environmental control systems that comprise the presently disclosed acoustic air ducts, etc.

FIG. 6A shows a perspective view of a selected length of material that can be configured as the structural component configured to be the structural middle layer for the presently disclosed acoustic air ducts. FIG. 6A shows a selected length of a structural component 114 in the form of a co-curable material that is configured into a semi-rigid tubular form and that comprises a fiber weave material and material configuration both referred to herein as a "leno weave". Structural component 114 is further shown in FIG. 6A as comprising a structural component first side 114a (e.g., an "inner" side) and a structural component second side 114b (e.g., an "outer" side).

FIG. 6B is an enlarged view of a segment of the structural component 114 shown in FIG. 6A. As shown in FIG. 6B, structural component 114 comprises a plurality of through openings 116 in the structural component 114. According to present aspects, the structural component 114 preferably comprises a weave construction such that from about 30% to about 50% of the area of the structural component represents "open area" constituting through openings extending through the structural component material (e.g., the cumulative area of the through openings representing from about 30% to about 50% of a similarly dimensioned and hypothetically "solid" structural component that does not have through openings, etc.). Stated another way, the total area of "voids" or open spaces through the walls of the structural component 114 represents an amount of area equivalent to from about 30% to about 50% of the structural material area.

The open spaces through the presently disclosed structural components 14, 114 that are configured to form the presently disclosed acoustic air duct structural middle layer, equivalently referred to herein as through openings 16, 116 represent voids having a cumulative selected total void or through opening area along a longitudinal length of the rigid structural components (that can be, e.g., tubular structural components, etc.) representing from about 30% to about 50% of the total area of the structural component. The through openings 16, 116 can have any selected shape and/or dimension, and can be configured to represent patterns, can occur symmetrically or asymmetrically in their dimension and pattern both individually or as through opening groupings, and/or the through openings can be configured to occur randomly and have varying dimensions along the length of the structural component.

The through openings 16, 116 in the structural component can extend perpendicularly through the thickness of the structural component (e.g., perpendicular with respect to a longitudinal axis of the structural component, etc.), or the through openings can be configured to extend through the thickness of the structural component at a selected non-perpendicular angle (e.g., at an angle other than 90 degrees with respect to a longitudinal axis of the structural component, etc.) for purposes that can include imparting strength characteristics to the structural component, or that otherwise can cumulatively contribute to the structural component rigidity and sound transmission through the structural component.

According to present aspects, the through openings can facilitate transmission of sound waves through the structural component, and otherwise allow sound waves to pass from an acoustic air duct internal pathway, and further direct sound waves and sound wave frequencies (that, for example, pass through the air impervious acoustic air duct inner layer film, that can be an acoustically transparent sound permeable and air impervious acoustic air duct inner layer film) through the structural component, and into an acoustically absorptive outer layer of the presently disclosed acoustic air ducts. According to present aspects, an acoustically transparent material allows noise of various selected frequencies to propagate through such material with minimal reflection.

The tubular structural components, at least as shown in the FIGS., can have a cross-section (and therefore can structurally support longitudinal duct pathways) that are circular, substantially circular, elliptical, etc. In addition, although not shown, the structural components can be configured by appropriate tooling, molding, etc., to have cross-sections (and longitudinal duct pathways) of any desired cross-sectional geometry including, for example, rectangular, hexagonal, triangular, other non-circular geometries, etc.

FIGS. 7 and 8 are perspective views of a presently disclosed acoustic air duct in varying stages of completion, and are similar to that shown in FIGS. 3 and 4, with the exception that in FIGS. 7 and 8, the structural component 114 configured into the structural middle layer 112 of the acoustic air duct assembly is a co-curable leno weave material.

As shown in FIG. 7, a tool 11 that can be, for example, a solid substantially cylindrical mandrel, etc.) is first enveloped (e.g., "covered") by an air impervious inner layer film 10, with the air impervious inner layer film first side 10a (not visible in FIG. 7) positioned adjacent the tool 11. Air impervious inner layer film second side 10b is then positioned in intimate contact with the structural middle layer first side 112a (e.g., the structural component "inner" side, not visible in FIG. 7) of the structural middle layer 112, with structural middle layer second side 112b (e.g., the structural component "outer" side) visible. According to present aspects, as shown in FIG. 7, the structural middle layer 112 is configured to intimately contact and otherwise completely surround and/or envelope the air impervious inner layer film 10.

FIG. 8 is a partially exposed view (and just prior to completion) of a nearly completed acoustic air duct 120, according to present aspects, with an acoustically absorptive outer layer 30 having an acoustically absorptive outer layer first (e.g., "inner") side 30a (configured to intimately contact and otherwise completely surround and/or envelope the structural middle layer second side 12b) and an acoustically absorptive outer layer second (e.g., "outer") side 30b. As shown in FIG. 4, the acoustically absorptive outer layer can incorporate or otherwise support an outer protective layer 32.

The substantially cylindrical dimension of the tool 11 facilitates the formation and manufacture and assembly of the acoustic air duct assembly such that the acoustic air duct 120 is configured into a geometry that complements the geometry of the tool 11. That is, for example, by sequentially wrapping the component acoustic air duct component layers onto the cylindrical tool 11, the resulting component layers acquire a longitudinally cylindrical form and configuration that can be a substantially cylindrical elongated tubular form in the longitudinal axis, with the elongated tubular form and shape retained by the air duct, even after the multi-layered acoustic air duct is removed from the tool 11.

FIG. 9 is a cross-sectional view of the completed acoustic air duct 120 of the type shown in FIG. 8, taken along line B-B, with the understanding that the acoustically absorptive outer layer 30 is configured to completely surround and/or envelope the structural component 12, and that the entire formed acoustic air duct 120 has been removed from the tool 11 As shown in FIG. 9, acoustic air duct 120 is configured to retail a substantially tubular shape as evidenced by the substantially circular geometry along the longitudinal axis of the acoustic air duct 120. An acoustic duct pathway 122 is maintained along the length of the acoustic air duct 120, with the acoustic air duct comprising a multi-layered construction as described herein, and where the air impervious inner layer film 10 establishes an immediate boundary for the acoustic air duct pathway 122. A structural middle layer 112 surrounds the air impervious inner layer film 10, and the acoustically absorptive layer 30 surrounds the structural middle layer 112, with the structural support configured to provide a rigid endoskeleton to the acoustic air duct 120, with the structural component configured to be a structural middle layer 112 sandwiched between the air impervious inner layer film 10 and the acoustically absorptive outer layer 30. As further shown in FIG. 9, the acoustically absorptive outer layer 30 can comprise a protective outer coating 32 that can be integral with the acoustically absorptive outer layer 30, or that alternately can be a separate protective outer layer that is applied to the acoustically absorptive outer layer 30.

According to present aspects, FIG. 10 illustrates, in progressive steps presented as step "A" through step "H", an exemplary manufacturing and/or assembly progression for acoustic air duct segment assemblies of a selected segment length. When the completed acoustic air duct segments are combined and otherwise attached together linearly, the individual air duct segments can be combined, assembled, and otherwise configured to form the presently disclosed acoustic air duct of a selected acoustic air duct total length that can be incorporated into presently disclosed environmental control systems, including environmental control systems installed into larger objects including, for example vehicles that can include, for example, aircraft, etc.

As shown in FIG. 10, in step "A" a tool 11 in the form of, for example, an elongate substantially cylindrical mandrel is provided. In step "B" an amount of support material 140 is first provided to the tool 11 at selected locations along the length of the tool. The support material is applied to the tool 11 to a selected thickness and is configured to form support ring first layer 142 and beaded ends 144 to provide support and augment rigidity of the resultant acoustic air duct.

In step "C" of FIG. 10, a sealing film layer is provided to the tool 11 in the form of an air impervious film inner layer 146 that will form the innermost layer of the resulting acoustic air duct, and that will form the inner wall of the acoustic air duct and otherwise "bound" the acoustic air duct pathway. As shown in step "C" of FIG. 10, an air impervious film inner layer film 146 can be applied to the tool 11 as a single ply of film material (e.g., from a sheet, roll, etc.) or as a plurality of consecutively or concurrently applied plies (e.g., a multi-ply laminate inner layer comprising a plurality of plies), to wrap around the tool 11, cover the underlying support rings 142 and, if desired, cover at least a portion of the beaded ends 144. Step "C" shows the air impervious film inner layer 146 applied such that at least one ply of the air impervious film layer 146 can form an inner layer film seam 146a that can comprise an area of overlap of at least one ply of applied air impervious inner layer film 146. According to a present aspect, the air impervious inner layer film can, for example, comprise polyetheretherketone (PEEK), and can, for example, overlap at the inner layer film seam 146a that can represent a distance of about 0.5 inch, and the air impervious inner layer film 146 can, for example, further overlap about 0.5 inch of the beaded ends 144.

In step "D" of FIG. 10, a length of structural component 148 in the form of a leno weave material is applied to the tool to overwrap the air impervious film layer 146 to form a structural middle layer of the acoustic air duct segment assembly 150. The leno weave material can comprise a fiber matrix comprising an epoxy-based resin. The fiber matrix can, for example, comprise a carbon fiber, a boron fiber, an aramid fiber, a glass fiber, and combinations thereof. The leno weave material can comprise open spaces or open area in the weave that is equivalent from about 30% to about 50% of the surface area of the leno weave material.

In step "E of FIG. 10, additional materials can be added to a region of the location of the beaded ends 144 of the acoustic air duct segment assembly 150 to form end rings 151. If desired, step "E" of FIG. 10 further shows to deposit or application of additional support ring material to form a support ring second layer 152 occurring at or near the location of the support ring first layer 142, but on the opposing side (the "outer" side) of the leno weave material (the structural component 148).

According to present aspects, the materials used to form the support ring first layer 142, support ring second layer 152, beaded ends 144, air impervious film layer 146, and the structural component 148 can be materials that are co-curable with each other, and that can, together, co-cure in an appropriate co-curing regimen. By co-curing the listed components shown in step "E" of FIG. 10, a co-cured acoustic air duct segment assembly 160 is formed that can have tailored co-cured properties including a tailored rigidity, and other structural characteristics, etc.

In step "F" of FIG. 10, seal rings 172 can be fitted toward the segment ends 162, 164 of acoustic air duct segment 160 to form acoustic air duct segment 170. The seal rings 172 can have a geometrically circular configuration and can have an outer diameter that is greater than the outer diameter of the acoustic air duct segment assembly 160, 170. In one example, the outer diameter of the seal rings 172 can exceed the outer diameter of the acoustic air duct segment assembly 160, 170 by a distance ranging from about 0.3 inch to about 0.6 inch. The distance to which the outer diameter of the seal rings 172 exceed the outer diameter of the acoustic air duct segment assembly 160, 170 can be equivalent to the thickness of an acoustically absorptive outer layer that is supplied to the acoustic air duct segment assembly 170, for example, in step "G" of FIG. 10.

As further shown in step "F" of FIG. 10, end ring 151 in conjunction with seal ring 172 are configured to form an air duct segment coupler that is configured to mate with adjacent air duct segments and adjacent segment couplers to form an elongated finished acoustic air duct having an overall selected longitudinal length. The end ring 151, support ring first layer 142, support ring second layer 152, and seal ring 172 individually or in combination with one another can further provide support and selected rigidity to the acoustic air duct segments and to the acoustic air duct comprising the individual segments. The selected amount of rigidity of the acoustic air duct segments is primarily provided by the co-cured structural component 148 shown in FIG. 10 comprising a co-curable leno weave composite material (that is co-cured into a co-cured leno weave material) that can comprise a co-curable epoxy resin-based material that can be co cured with the acoustic air duct components shown at least in steps B, C, D and E of FIG. 10.

As shown in step "G" of FIG. 10, an acoustically absorptive outer layer 182 is provided to the outer surface of the structural component 148 of the acoustic air duct segment assembly 170, with the acoustically absorptive outer layer 182 covering completely the outer surface of the structural component 148 to form the acoustic air duct segment assembly 180. If desired, the inner surface of the acoustically absorptive outer layer can comprise an adhesive layer, with such adhesive layer configured to contact the outer surface of the structural component 148. Alternatively, an adhesive layer can be applied to the outer surface of the structural component prior to applying and positioning and otherwise contacting the acoustically absorptive outer layer 182 adjacent to the structural component 148.

In an alternative aspect, when the air impervious inner layer film and structural middle layer are co-cured together, an adhesive layer 15 (that can be, for example, an adhesive layer film), can be applied to either or both sides of the structural middle layer 120. According to further aspects, the adhesive layer can be a co-curable adhesive layer that can be co-cured with the co-curable air impervious inner layer and the co-curable structural middle layer.

In further alternate aspects, no adhesive layer need be added to any of the component layers of the resulting acoustic air duct segments. In one aspect, the acoustically absorptive outer layer can comprise an open cell foam including, for example, a melamine foam material, with the acoustically absorptive outer layer 182 having a selected thickness ranging from about 0.3 inch to about 0.6 inch.

As shown in FIG. 10, an exemplary acoustic air duct segment manufacturing process is completed in step "H" by sealing any acoustically absorptive outer layer seams 184a, 184b, 184c with sealing material 186 that can be in the form of, for example, a sealing tape, sealing film, etc., to form the completed acoustic air duct segment assembly 190. The sealing tape 186 can comprise one or more layers of adhesive applied to a tape material to form the sealing material 186, or the sealing material 186 in the form, for example of a tape can comprise an integral adhesive material on a tape surface. As shown in step "H" of FIG. 10, the sealing material is positioned proximate to cover the seams 184a, 184b, 184c, resulting from the applied acoustically absorptive outer layer 182 positioned onto the structural component 148 that forms a structural middle layer of the presently disclosed acoustic air duct assembly and the individual acoustic air duct segments. The sealing material 186 is configured to restrain the acoustically absorptive outer layer 182 in position. According to present aspects, the sealing material 186 includes or corresponds, for example, to a pressure sensitive tape, with the pressure sensitive tape further comprising, for example, a metalized polyetheretherketone (e.g., a metalized PEEK, etc.) material.

According to present aspects, the acoustically absorptive outer layer 182 can comprise a melamine open cell foam and can have an acoustically absorptive outer layer 182 average thickness selected to absorb various sound frequencies to a selected degree. In addition, when the acoustically absorptive outer layer 182 comprises a melamine open cell foam material, such material can comprise an outer layer to further impact sound reduction by selectively allowing an amount of varying sound frequencies to escape from the constructed acoustic air duct, and/or redirect a selected amount of varying sound frequencies back into the acoustically absorptive outer layer 182. The present material selected for use as the acoustically absorptive outer layer 182 provides a selected level of sound absorption when the acoustically absorptive outer layer 182 with the average thickness ranging from about 0.3 inch to about 0.6 inch. When melamine foam is selected, the average thickness range can comprise a single ply layer of melamine foam, or a plurality of plies of melamine foam (e.g., three plies or four plies, etc.) such that the total average thickness of the melamine foam configured to form the acoustically absorptive outer layer 182 ranges from about 0.3 inch to about 0.6 inch. The melamine foam provides a significantly greater level of sound absorption, sound redirection, and reduced sound transmission compared to other open cell foam materials.

As shown at least in FIGS. 6A, 6B, 7, 8, 9, and 10, the structural middle layer can be a rigid, air and sound permeable tube of composite material (referred to equivalently herein as a "rigid air permeable tube"). The rigid air-permeable tube of composite material can include or correspond to a tube of composite material formed from "open weave" composite material. Open weave composite materials include composite material having an arrangement or pattern of fibers that is open loop. Examples of open loop arrangements include a leno weave arrangement (e.g., a gauze weave or cross-weave arrangement). The leno weave arrangement is a type of plain weave in which adjacent "warp" fibers are twisted around consecutive "weft" fibers to form a spiral pair, effectively "locking" each weft in place.

According to present aspects, a leno weave can comprise a composite material in a tubular configuration along a longitudinal axis, such that a cross-section of leno weave tube can comprise a substantially circular configuration. The open weave composite material tube includes and can be formed from a plurality of plies of open weave curable resin-based composite material such that when the open weave composite material tube in the cured state can contain openings in the weave through which sound can pass. That is, according to present aspects, the curable resin-based composite material in the form of the leno weave material, in the co-cured state, forms a rigid, tubular sound permeable structural material. The sound permeability of the open weave composite material structural material tube serves as the structural material layer for the present acoustic air ducts, enabling the acoustically absorptive outer layer of the constructed ducts to absorb sound in the manner of, and a replacement for, a noise attenuating muffler.

The acoustically absorptive outer layer can be positioned adjacent to the structural component exterior to completely cover the structural component is configured to provide a selected amount of sound absorption, including the sound absorption of selected sound frequencies. The acoustically absorptive outer layer can include a layer of foam and/or felt that can include open cell foam or aramid felt, and that is preferably a selected thickness of melamine foam having a selected thickness ranging from about 0.01 in to about 0.03 inch. Preferred aramid felts can include meta-aramid fibers, para-aramid fibers, or a combination thereof, that can be matted, condensed, pressed, etc.

While the presently disclosed acoustic air duct formation shown at least in FIGS. 4 and 8 illustrate applying the acoustically absorptive outer layer to the structural component (e.g., to completely cover the structural component) in a wrapping configuration referred to as a "cigarette" wrap, present aspects further contemplate wrapping the structural component with the acoustically absorptive outer layer using any wrapping configuration including, for example a "spiral" wrap configuration (not shown).

According to present aspects, when the structural middle layer is co-curable with the co-curable air impervious inner layer film, and the structural middle layer comprises a co-curable leno weave (for example, a carbon fiber matrix epoxy resin-based material), the structural component need not comprise an adhesive layer. According to present aspects, when a co-curable leno weave material is incorporated into the presently disclosed acoustic air ducts, significant weight savings is achieved and significant manufacturing protocol complexity can be reduced by obviating the inclusion of an adhesive material layer, and co-curing the co-curable air impervious inner layer film with the co-curable leno weave structural middle layer.

According to present aspects, co-curable leno weave structural middle layer, that can be a composite material can be co-cured with the co-curable air impervious inner layer (that can be an air impervious inner layer film) using a cure cycle that is selected to cure the co-curable leno weave structural middle layer composite material. That is, the cure cycle (referred to equivalently herein as the "cure regimen" and/or "curing regimen") that is selected to cure the co-curable composite material configured as the co-curable structural middle layer will also cure the co-curable air impervious inner layer such that the co-curable structural middle layer and the co-curable air impervious inner layer are co-cured to form a co-cured structural middle layer and a co-cured air impervious inner layer that is adhered to the co-cured structural middle layer, with the co-curable resin matrix in the co-curable structural middle layer acting as an adhesive. In this way, according to present aspects, the presence of an additional adhesive layer between the structural middle layer and the air impervious inner layer is obviated.

According to a present aspect, a selected cure cycle can comprise a two-step process with a selected first temperature ramp up to a selected first "holding" temperature for a selected duration, followed by a selected second temperature ramp up to hold at a second holding temperature for a selected duration. The temperatures and durations selected can vary to accommodate the desired curing required and depending on the co-curable materials selected (e.g., the co-curable thermoset materials selected, etc.)

In addition, according to present aspects, the materials selected to form at least the support material for the beaded ends 144, support rings 142 can be co-curable material selected to co-cure with the co-curable air impervious inner layer material and the co-curable structural middle layer material in a co-curing cycle as set forth herein. In this way, the at least the materials and components shown in steps B, C, and D of FIG. 10 can be co-cured together. If desired, according to further present aspects, end rings 151 and support ring second layer 152 shown in step E of FIG. 10 can be co-curable material selected to co-cure with the co-curable air impervious inner layer material and the co-curable structural middle layer material in a co-curing cycle as set forth herein.

According to present aspects, a "co-curable" material is defined as a material that can be cured with another material such that the two co-curable materials will cure when exposed to common curing conditions, such as those that can be imposed by a predetermined curing regimen (predetermined temperature, pressure, ramp up temperatures/rates, dwell periods, etc.) to form a "co-cured" composition. The co-curable polyurethane-coated epoxy-based composite material is referred to equivalently here as the "co-cured coated composite material".

Returning to the structural middle layer and the through openings contained therein, according to present aspects, the arrangement, dimension, angles, patterns, etc. of the through openings can be selected to cause destructive sound interference of, and otherwise reduce "noise" that can attend an air flow through ducts by canceling out sound waves and sound wave frequencies in sound waves that can be generated by air moving through a duct, etc. For example, according to present aspects, when a sound wave propagates from within the air duct to the structural component, the structural component through openings can be dimensioned and arranged along the length of the structural middle layer of the present acoustic air ducts to reflect and/or redirect a portion of the sound wave back into the interior of the duct, or to allow a selected portion of the soundwave and selected frequencies of the soundwave to pass through the structural component via the through openings and be absorbed by the acoustically absorptive outer layer of the present acoustic air duct. When a selected portion of a soundwave or selected soundwave frequencies are redirected (including, for example, "reflected" back) into the air duct, such redirected frequencies can cause an intentional destructive interference with subsequent soundwaves observed as a cancellation of portions of soundwaves and/or selected sound wave frequencies, and that can result in a significant reduction in sound including, for example, air flow "noise".

Multiple factors including air pressure, air flow velocity, duct length and duct width and duct volume dimensions, can contribute to air flow noise generation. An environmental control system can present design and footprint constraints as to available space for air flow ducts, etc. According to present aspects, the structural component through openings of the presently disclosed acoustic air ducts can be tailored to include, for example, a useful through opening pattern, through opening dimension, percentage of total "open" area, angle of the through opening, etc., for the purpose of attaining a selected level of sound reduction even when the fixed dimensions of the air duct system is impacted and/or constrained by available "footprint" of, for example, an environmental control system, etc.

As shown in FIG. 12, an environmental control system 202 of, for example, an aircraft 200, can include a duct system 212, an air conditioning unit 214, an intake port 222, and an exhaust port 224. The duct system 212 as shown can be configured to provide treated fluid (e.g., treated air 352 of FIG. 11) to, for example, passengers within an aircraft 200. The duct system 212 can include one or more ducts. As shown in FIG. 12, the duct system 212 can include first zone ducts 232, riser ducts 234, second zone ducts, 236, and outlet ports 238.

One or more of the first zone ducts 232, the riser ducts 234, and the second zone ducts 236 can include ducts of the type disclosed herein. As shown in FIG. 12, the first zone ducts 232 can include at least one of the ducts shown herein. The first zone ducts 232, the riser ducts 234, and the second zone ducts 236 can be configured to transport fluid through the duct system 212. The outlet ports 238 can be configured to provide the transported fluid to, for example, passengers in the aircraft 200. For example, the outlet ports 238 can include and/or correspond to cabin and/or passenger vents. The outlet ports 238 can be controllable (e.g., opened or closed) by the passengers, etc. The outlet ports can be coupled to the first zone ducts 232, the riser ducts 234, the seconds zone ducts 236, or any combination thereof.

The air conditioning unit 214 can be in fluid communication with the duct system 212 and can be configured to condition or treat fluid (e.g., air) within the ECS 202. The intake port n222 can intake fluid from within the aircraft 200 (e.g., a pressurized compartment and/or cabin of the aircraft 200) or from outside the aircraft 200 (e.g., ambient or unpressurized air).

The exhaust port 224 can be in fluid communication with the duct system 212 and can be configured to exhaust or expend fluid (e.g., air) from the duct system 212. For example, the exhaust port 224 can exhaust fluid out from the aircraft and/or out of the ECS 202 (e.g., exhaust fluid to a filter or to another system of the aircraft 200). Although the ECS 202 as shown includes an air conditioning unit 214, in other aspects, the ECS 202 can include further and/or different components (e.g., a heater, electrical equipment, exhaust system, fan, orifices, etc., including combinations thereof) in addition to or in the alternative of the air conditioning unit 214. Operation of the ECS 202 is further described with reference to FIG. 11.

FIG. 11 is a diagram illustrating an example of an aspect of the ECS 202 of FIG. 12. As shown in FIG. 11, the first zone ducts 232 are located below a cabin 312 (e.g., in an area 314 below a floor 322 of a cabin 312) of the aircraft 200, the riser ducts 234 are located between the cabin 312 and an exterior (e.g., skin) of the aircraft 200, the second zone ducts 236 are located above a ceiling 324 of the cabin 312 (e.g., in a crown 316) of the aircraft 200. During operation, treated air 352 from an air conditioning unit 214 (and/or intake port 222) is received by the first ducts 232. The first zone ducts 232 transport the treated air 352 through the first zone ducts 232 and to the riser ducts 234. As the treated air 352 moves through the first zone ducts 232, the treated air can generate noise. Additionally or alternatively, noise can be generated by fans, duct geometry, flow control devices, object(s) in a flow path of the treated air 352, or a combination thereof. The first zone ducts 232 attenuate the noise and further provide thermal insulation such that the heat of ambient (e.g., air external to the ECS 202) is not transferred to the treated air 352 and that heat of the treated air 352 is not transferred to the ambient air.

The riser ducts 234 transport the treated air 352 through the riser ducts 234 and to he second zone ducts 236. According to certain aspects, the riser ducts 234 also transport the treated air 352 to the outlet ports 238, where the delivery into a passenger cabin of an aircraft of treated air 352 can be, for example, controlled by passengers, on demand. As the treated air 352 moves through the riser ducts 234, the treated air 352 generates noise. The riser ducts 234 attenuate the noise and can provide thermal insulation.

The second zone ducts 236 transport the treated air 352 through the second zone ducts 236 and to the air conditioning unit 214 (and/or exhaust port 224). In further aspects, the second zone ducts 236 transport the treated air 352 to the outlet ports 238, where the delivery into a passenger cabin of an aircraft of treated air 352 can be, for example, controlled by passengers, on demand. As the treated air 352 moves through the second zone ducts 236, the treated air 352 generates noise. The second zone ducts 236 attenuate the noise and can provide thermal insulation.

As shown in FIG. 12, an exemplary ECS 202 contained within, for example an aircraft 200 is free of distinct noise attenuating mufflers (e.g., zone mufflers). For example, the ECS 202 does not include duct sections that have external noise attenuating mufflers encasing the air duct sections and/or air duct dedicated noise attenuating muffler combination sections configured to absorb sound above or below, for example, an aircraft cabin 312, as would otherwise be present in a conventional ECS.

FIGS. 13 and 14 outline present aspects directed to vehicle manufacture and service as illustrated by the flowchart presented in FIG. 13 and a vehicle 1802 as illustrated by the block diagram of FIG. 14. A vehicle produced by the vehicle manufacturing and service method 1700 of FIG. 13, such as the vehicle 1802 can include an aircraft, an airship, a rocket, a satellite, another terrestrial, airborne, or marine vehicle, with such vehicle being crewed or uncrewed (e.g., a drone or unmanned aerial vehicle (UAV), etc.).

Aspects of the present disclosure are directed to vehicle manufacture, maintenance, and service. FIG. 13 is a flowchart outlining a method 1700 of duct manufacturing and service. For example, during pre-production processes, method 1700 includes specification and design of a vehicle 1702, such as a vehicle 1802 set forth in FIG. 14 and described herein. During specification and design of vehicle 1802, for example, method 1700 can include specifying a design of a duct, such as the one or more acoustical air ducts presented herein. Method 1700 further includes material procurement 1704 including, for example procuring materials for one or more of the acoustical air ducts that can be incorporated into vehicle 1802, for example. During production, method 1700 further includes component and assembly manufacturing 1706 and integration 1708 into a vehicle, including component and subassembly manufacturing (e.g., manufacturing one or much of the acoustical air ducts and/or duct segments), and system integration (e.g., coupling one or more components of the vehicle, etc.). Method 1700 further includes certification and delivery 1710 of a vehicle 1802, and placing such vehicle in service 1712. Certification and delivery can include certifying by, for example, inspection or non-destructive testing, etc., of one or more of the acoustic air ducts, and/or air duct segments, and/or the environmental control systems comprising the installed presently disclosed acoustic air ducts.

While in service, vehicle 1802 can be scheduled for routine maintenance and/or routine (that can include, for example, modification, reconfiguration, refurbishment, reworking, retrofitting, etc.). Method 1700 can include performing maintenance and service 1714 on the vehicle such as maintenance and servicing of, for example, the duct system 212, air conditioning unit 214 (e.g., as shown in FIG. 12), or one or more of the ducts or duct segments as described herein. As a particular non-limiting illustration, performing maintenance and service can include refitting a vehicle and an environmental control system within a vehicle by removing a duct and noise attenuating muffler from the ECS 202, FIG. 12) and installing one or more of the presently disclosed acoustic air ducts in the ECS to replace a previous duct system that comprised a noise and attenuating muffler (e.g. a zone muffler, etc.).

Each of the processes of method 1700 can be performed by a system integrator, a third party, and/or an operator (e.g., a customer). According to the present disclosure, a system integrator can include, without limitation, any number of vehicle manufacturers and system subcontractors. A third party can include, without limitation, any number of vendors, subcontractors, suppliers, etc. Operators can include, for example, an airline, leasing company, military entity, service organization, etc.

FIG. 14 is a block diagram representing an illustrative implementation of a vehicle 1802 that includes the presently disclosed acoustical air duct, acoustical air duct segments, and ECSs (e.g., ECS 202 shown in FIG. 12, etc.) that comprise the presently disclosed ducts and duct segments. For example, vehicle 1802 can include an aircraft 200 of the type shown in FIG. 15. The vehicle 1802 can have been produced by at least a portion of method 1700 as shown in FIG. 14, with the vehicle 1802 including an airframe 1818, an interior 1822, and a plurality of systems 1820 that can include a propulsion system 1824, an electrical system 1826, an environmental system 1828, a hydraulic system 1830, etc. The plurality of systems can further include ECS 202 that can be a part of the environmental system 1828, or separate from environmental system 1828. The ECS 202 mas shown in FIG. 14 includes the first zone ducts, riser ducts 234, and the second zone ducts 236 shown in FIG. 11, for example.

Apparatuses, systems, and methods included herein can be employed during any one or more of the stages of the method 1700 of FIG. 13. For example, components or sub-assemblies corresponding to production process 1708 can be fabricated or manufactured in a manner similar to components or subassemblies produced while the vehicle 1802 is in service, at 1712 for example, and without limitation. In addition, one or more apparatus implementations, method implementations, or combination thereof can be used during the production stages (e.g., stages 1702 through 1710 of the method 1700), for example, by substantially expediting assembly of or reducing the cost of the vehicle 1802. Similarly, one or more of apparatus implementations, method implementations, or combinations thereof, can be used while the vehicle is in service at stage 1712, for example, and without limitation, to include maintenance and service, at 1714.

FIG. 15 is an overhead plan view of a vehicle in the form of an aircraft 200 including the ECS 202 as shown in FIG. 14, for example. Aircraft 200 includes a pair of wings 1904 faired into a fuselage 1902. Each wing 1904 carries an engine 1906. Fuselage 1902 includes cabin 312 (e.g., a cabin for passenger and crew). AAs further shown in FIG. 15, aircraft 200 includes two air conditioning units 214 to provide treated air 352 (e.g. conditioned air) to the cabin 312 via the duct system 212. Each air conditioning unit 214 includes a corresponding duct system 212 extending along a length of cabin 312 fore and aft. The duct system 212 includes the first zone ducts 232, the riser ducts 234, and the second zone ducts 236 as also shown at least in FIGS. 11 and 12, and described herein.

The first zone ducts 232, the riser ducts 234, and the second zone ducts 236 can be arranged as shown in FIG. 11. For example, the first zone ducts 232 receive the treated air 352 from a corresponding air conditioning unit 214 and provide the treated air 352 to the outlet ports 238, such as via the riser ducts 234 and/or the second zone ducts 236. Although two exemplary outlet ports 238 are shown in FIG. 15, the acoustic air duct system 212 can include more than two outlet ports 238. Each air conditioning unit 214 is coupled to at least one exhaust port 224 for outputting waste hot air from the air conditioning unit 214 overboard and into the atmosphere, for example. According to present aspects, each exhaust port 224 includes a corresponding ram air outlet (not shown) that can be located on the underside of a corresponding wing. FIG. 15 further shows each air conditioning unit 214 having two intake ports 222 for receiving air to be treated and distributed to the cabin 312 via the duct system 212 and/or waste hot air to be exhausted. As further shown, each air conditioning unit 214 has an intake port 222A (e.g., a first intake port) to receive air from the atmosphere and has an intake port 222B (e.g., a second intake port) to receive air from the cabin 312.

According to present aspects, FIGS. 16, 17, 18, and 19 are flowcharts outlining methods for making, using, installing, etc. the presently disclosed acoustic air ducts and acoustic air duct segments. FIG. 16 is a flowchart outlining a method 2000, with the method including positioning 2002 (e.g., applying, depositing, etc.) an air impervious inner layer {that can be an inner layer film having a single ply or a plurality of plies) onto a tool (that can be, for example, a longitudinally cylindrical mandrel), positioning 2004 a structural component onto the air impervious inner layer to form a structural middle layer, and positioning 2006 an acoustically absorptive outer layer onto, and otherwise adjacent to the structural component and to substantially cover the structural component. The material component layers at least as set forth and described herein can be used to perform the method 2000.

As set forth herein, at least the air impervious inner layer and the structural component can be made from co-curable materials such that the air impervious inner layer and the structural component can be subjected to a selected co-curing regimen to co-cure the air impervious inner layer and the structural component.

FIG. 17 is a flowchart outlining a method 2100, with the method including positioning 2102 (e.g., applying, depositing, etc.) an air impervious inner layer {that can be an inner layer film having a single ply or a plurality of plies) onto a tool (that can be, for example, a longitudinally cylindrical mandrel), and positioning 2104 a structural component onto the air impervious inner layer to form a structural middle layer. Method 2100 further includes co-curing 2106 the air impervious inner layer and the structural component, and positioning 2108 an acoustically absorptive outer layer onto, and otherwise adjacent to the structural component and to substantially cover the structural component. The material component layers at least as set forth and described herein can be used to perform the method 2100.

FIG. 18 is a flowchart outlining a method 2200 including installing 2202 an acoustically absorptive air duct into an environmental control system with the acoustically absorptive air duct comprising an air impervious inner layer film, with the air impervious inner layer film comprising an air impervious inner layer film first surface and an air impervious inner layer film second surface. The acoustically absorptive air duct further comprises, a structural middle layer comprising a structural component, with the structural middle layer comprising a structural middle layer first side and a structural middle layer second side, with the structural middle layer first side positioned adjacent the air impervious inner layer film second surface, and with the structural middle layer comprising a plurality of through openings, with the through opening comprising a through opening area representing from about 30% to about 50% of a structural middle layer surface area. Acoustically absorptive air duct further comprises an acoustically absorptive outer layer positioned adjacent the structural middle layer second side and configured to substantially cover the structural middle layer, and wherein the structural middle structural layer is sandwiched between the air impervious inner layer film second side and the acoustically absorptive outer layer to form an acoustically absorptive air duct.

FIG. 19 is a flowchart outlining a method 2300 including installing 2302 an environmental control system into a vehicle with the environmental control system comprising an acoustically absorptive air duct comprising an air impervious inner layer film, with the air impervious inner layer film comprising an air impervious inner layer film first surface and an air impervious inner layer film second surface. The acoustically absorptive air duct further comprises, a structural middle layer comprising a structural component, with the structural middle layer comprising a structural middle layer first side and a structural middle layer second side, with the structural middle layer first side positioned adjacent the air impervious inner layer film second surface, and with the structural middle layer comprising a plurality of through openings, with the through opening comprising a through opening area representing from about 30% to about 50% of a structural middle layer surface area. Acoustically absorptive air duct further comprises an acoustically absorptive outer layer positioned adjacent the structural middle layer second side and configured to substantially cover the structural middle layer, and wherein the structural middle structural layer is sandwiched between the air impervious inner layer film second side and the acoustically absorptive outer layer to form an acoustically absorptive air duct.

The present aspects may, of course, be carried out in other ways than those specifically set forth herein without departing from essential characteristics of the present disclosure. The present aspects are to be considered in all respects as illustrative and not restrictive, and all changes coming within the meaning and equivalency range of the appended claims are intended to be embraced therein.

What is claimed is:

1. An acoustically absorptive environmental control system air duct, the acoustically absorptive environmental control system air duct comprising:
   a co-cured air impervious inner layer film, said co-cured air impervious inner layer film comprising an air impervious inner layer first side and an air impervious inner layer second side, said air impervious inner layer first side configured to line the inner wall of the environmental control system air duct;
   a co-cured structural middle layer comprising a structural component, said structural middle layer comprising a structural middle layer first side and a structural middle layer second side, said structural middle layer first side positioned adjacent the air impervious inner layer second side, said structural middle layer comprising a plurality of through openings, said plurality of through openings comprising a through opening area representing from about 30% to about 50% of a structural middle layer surface area;
   an acoustically absorptive outer layer positioned adjacent the structural middle layer second side;
   wherein the structural middle layer is sandwiched between the air impervious inner layer second side and the acoustically absorptive outer layer to form an acoustically absorptive air duct;
   a co-cured support ring covered by the co-cured air impervious inner layer film;
   a co-cured beaded end at least partially covered by the co-cured air impervious inner layer film; and
   wherein the co-cured air impervious inner layer film, the co-cured structural middle layer, the co-cured support ring, and the co-cured beaded end are co-cured together.

2. The acoustically absorptive environmental control system air duct of claim 1, wherein said acoustically absorptive outer layer further comprises an exterior covering layer, said exterior covering layer comprising a metallized polyetheretherketone-containing material.

3. The acoustically absorptive environmental control system air duct of claim 1, said acoustically absorptive outer layer comprising a melamine-containing material.

4. The acoustically absorptive environmental control system air duct of claim 1, said structural middle layer comprising a co-cured leno weave material.

5. The acoustically absorptive environmental control system air duct of claim 4, said co-cured leno weave material further comprising a co-cured carbon fiber matrix epoxy resin-based material.

6. The acoustically absorptive environmental control system air duct of claim 5, said air impervious inner layer configured to co-cure with the co-cured carbon fiber matrix epoxy-resin-based material.

7. The acoustically absorptive environmental control system air duct of claim 1, wherein the structural middle layer comprises an additively manufactured component.

8. The acoustically absorptive environmental control system air duct of claim 7, further comprising an adhesive layer positioned between the structural middle layer and the air impervious inner layer.

9. The acoustically absorptive environmental control system air duct of claim 1, wherein the air impervious inner layer is a single ply film.

10. The acoustically absorptive environmental control system air duct of claim 1, said air impervious inner layer comprising a plurality of plies.

11. The acoustically absorptive environmental control system air duct of claim 1, said air impervious inner layer film comprising an average thickness ranging from about of about 0.25 mil to about 1 mil, said structural middle layer comprising an average thickness ranging from about 0.01 inch to about 0.03 inch, and said acoustically absorptive outer layer comprises an average thickness ranging from about 0.3 inch to about 0.6 inch.

12. An environmental control system comprising the acoustically absorptive environmental control system air duct of claim 1.

13. A vehicle comprising the acoustically absorptive environmental control system air duct of claim 1.

14. The vehicle of claim 13, wherein the vehicle is an aircraft.

15. A method for making an acoustically absorptive environmental control system air duct, said method comprising:
   providing an amount of co-curable support material onto a tool, said co-curable support material configured to form a co-curable support ring, said co-curable support material further configured to form a co-curable beaded end;
   positioning a co-curable air impervious inner layer onto the tool, said co-curable air impervious inner layer comprising a co-curable air impervious inner layer first side and an air impervious second side, said co-curable air impervious inner layer first side positioned adjacent the tool, said co-curable air impervious inner layer first side configured to cover said co-curable support ring, said co-curable air impervious inner layer first side configured to at least partially cover said co-curable beaded end;
   positioning a co-curable structural component onto the air impervious inner layer second side, said structural component comprising a structural component first side and a structural component second side, said structural component first side positioned adjacent the air impervious inner layer second side, said co-curable structural component comprising a plurality of through openings representing from about 30% to about 50% of the surface area of the co-curable structural component, said co-curable structural component configured to completely surround the co-curable air impervious inner layer;
   co-curing the co-curable support material, the co-curable air impervious inner layer, and the co-curable structural component to form a co-cured support ring, a co-cured beaded end, a co-cured air impervious inner layer, and a co-cured structural component;
   positioning an acoustically absorptive outer layer adjacent the structural component layer second side said acoustically absorptive outer layer configured to completely surround the co-curable structural component;
   and wherein the co-cured structural component is sandwiched between the co-cured air impervious inner layer second side and the acoustically absorptive outer layer to form the acoustically absorptive environmental control system air duct.

16. The method of claim 15, wherein the co-curable air impervious inner layer comprises a co-curable thermoplastic film layer and the co-curable structural component comprises a co-curable fiber-containing epoxy resin-based structural component.

17. The method of claim 16, before the step of positioning an acoustically absorptive outer layer adjacent the structural component second side of the co-cured structural component, the method further comprising:
co-curing the air impervious inner layer with the co-curable fiber-containing epoxy resin-based structural component.

18. A method for regulating sound in an aircraft environmental control system of an aircraft, the method comprising:
installing an acoustically absorptive environmental control system air duct into an aircraft environmental control system, said acoustically absorptive environmental control system air duct comprising:
a co-cured air impervious inner layer, said co-cured air impervious inner layer comprising an air impervious inner layer first side and an air impervious inner layer second side, said air impervious inner layer first side configured to line the inner wall of the acoustically absorptive environmental control system air duct:
a co-cured structural middle layer comprising a co-cured structural component, said co-cured structural middle layer comprising a structural middle layer first side and a structural middle layer second side, said co-cured structural middle layer positioned adjacent to and configured to completely surround the air impervious inner layer second side, said structural middle layer comprising a plurality of through openings representing from about 30% to about 50% of the surface area of the structural middle layer;
an acoustically absorptive outer layer positioned adjacent the structural middle layer second side; and
wherein the co-cured structural middle layer is sandwiched between the air impervious inner layer second side and the acoustically absorptive outer layer to form the acoustically absorptive environmental control system air duct.

19. The method of claim 18, wherein the co-cured air impervious inner layer comprises a co-cured thermoplastic film layer.

20. The method of claim 19, wherein
the co-cured structural component comprises a co-cured fiber-containing epoxy resin-based co-cured structural component.

* * * * *